US012171703B2

(12) United States Patent
Vos

(10) Patent No.: US 12,171,703 B2
(45) Date of Patent: Dec. 24, 2024

(54) BED LIFTING MECHANISM

(71) Applicant: ACCORA LIMITED, Cambridge (GB)

(72) Inventor: Julian Vos, Cambridge (GB)

(73) Assignee: ACCORA LIMITED, Cambridge (GB)

( * ) Notice: Subject to any disclaimer, the term of this patent is extended or adjusted under 35 U.S.C. 154(b) by 251 days.

(21) Appl. No.: 17/787,062

(22) PCT Filed: Dec. 18, 2020

(86) PCT No.: PCT/GB2020/053286
§ 371 (c)(1),
(2) Date: Jun. 17, 2022

(87) PCT Pub. No.: WO2021/123807
PCT Pub. Date: Jun. 24, 2021

(65) Prior Publication Data

US 2022/0378634 A1 Dec. 1, 2022

(30) Foreign Application Priority Data

Dec. 18, 2019 (GB) ..................................... 1918756

(51) Int. Cl.
*A61G 7/012* (2006.01)

(52) U.S. Cl.
CPC .................................... *A61G 7/012* (2013.01)

(58) Field of Classification Search
CPC .. A61G 7/012; A61G 1/0562; A61G 2210/30; A61G 7/018; A61G 7/015; A61G 7/005; A61G 1/013; A61G 1/02; A61G 1/0212; A61G 1/0567; A61G 1/0262; A61G 7/0528; A61G 1/052; A61G 2203/32; A61G 2203/723; A61G 7/08; A61G 1/0237; A47C 19/045; Y10T 74/206; F16B 7/0473
USPC ............ 296/20; 5/611, 616, 610, 11, 3, 400, 5/600, 617, 86.1
See application file for complete search history.

(56) References Cited

U.S. PATENT DOCUMENTS

| | | | | |
|---|---|---|---|---|
| 9,107,781 | B1 * | 8/2015 | Edgerton | A61G 7/002 |
| 2009/0094747 | A1 * | 4/2009 | Bly | A61G 7/018 74/522 |
| 2017/0258655 | A1 * | 9/2017 | Jutras | A61B 5/1115 |

FOREIGN PATENT DOCUMENTS

| | | | | |
|---|---|---|---|---|
| EP | 2873399 | A1 | 5/2015 | |
| EP | 2696833 | A1 | 8/2017 | |
| GB | 2414227 | A * | 11/2005 | A61G 1/0212 |
| GB | 2449298 | A * | 11/2008 | A61G 1/0212 |

* cited by examiner

*Primary Examiner* — Adam C Ortiz
*Assistant Examiner* — Madison Emanski
(74) *Attorney, Agent, or Firm* — Hayes Soloway PC

(57) ABSTRACT

The present invention relates to the field of lifting mechanisms for beds, and beds incorporating such lifting mechanisms. A lifting mechanism for a bed comprises a leg connecting a foot assembly to a frame for supporting a mattress, the frame defining a support plane; and a linkage mechanism connected between the frame and the leg and configured to allow the frame to move with respect to the foot assembly in a direction perpendicular to the support plane between a raised position and a lowered position. In the lowered position the leg extends parallel to the support plane, and during movement of the frame between the raised and lowered positions the foot assembly does not move in a direction parallel to the support plane.

18 Claims, 19 Drawing Sheets

BED LIFTING MECHANISM

CROSS-REFERENCE TO RELATED APPLICATIONS AND PRIORITY

This patent application claims priority from PCT Application No. PCT/GB2020/053286 filed Dec. 18, 2020, which claims priority from Great Britain Patent Application No. 1918756.6 filed Dec. 18, 2019. Each of these patent applications are herein incorporated by reference in their entirety.

FIELD OF THE INVENTION

The present invention relates to the field of lifting mechanisms for beds, and beds incorporating such lifting mechanisms. The lifting mechanisms are particularly suited to use in beds in the healthcare industry. The lifting mechanisms allow a bed to be lowered close to the floor to reduce injuries from falls and to be raised to a suitable height to enable easy access to a person lying on the bed.

BACKGROUND TO THE INVENTION

It is known to provide lifting mechanisms in beds in hospitals and other healthcare facilities. The lifting mechanisms are used to raise and lower the height of the bed, i.e. increase or decrease a distance between the mattress and the floor.

This has the advantage of allowing the bed to be raised to a height at which a healthcare worker, such as a doctor or nurse, has easy access to the patient without bending. In some situations the lifting mechanisms may also allow the bed to be lowered such that the mattress is close to the floor on which the bed is standing. This has the advantage that, if a patient rolls out of the bed, they will not fall a large distance to the floor. There is, therefore, a lower risk of injury to the patient than if the bed was at a greater height.

A number of prior art lifting systems are known; however, these known systems have a number of disadvantages. Some of these systems can be expensive to manufacture due to the large number of components and the complexity of the lifting mechanism. Other systems are bulky, taking up a lot of space at the end of the bed. These bulky systems not only significantly increase the size and weight of the bed, but also restrict access to the patient. If the lifting mechanism is located in a headboard or footboard of the bed, then this prevents the headboard or footboard being removed from the bed when, for example, emergency access is needed to the patient for cardiopulmonary resuscitation (CPR). When the lifting mechanism is located under the frame of the bed, this restricts how low the bed can go, i.e. close the mattress can be positioned relative to the floor.

It is an object of the present invention to provide an improved bed lifting mechanism that overcomes at least some of the disadvantages of prior art systems, whether referred to herein or otherwise.

SUMMARY OF THE INVENTION

A first aspect of the present invention provides a lifting mechanism for a bed, comprising:

a leg connecting a foot assembly to a frame for supporting a mattress, the frame defining a support plane; and a linkage mechanism connected between the frame and the leg and configured to allow the frame to move with respect to the foot assembly in a direction perpendicular to the support plane between a raised position and a lowered position, wherein during movement of the frame between the raised and lowered positions the foot assembly does not move in a direction parallel to the support plane.

In the lowered position the leg preferably extends parallel to the support plane.

The lifting mechanism preferably further comprises an actuator arranged to apply a force to the linkage mechanism to move the frame. The actuator may be a linear actuator.

In preferred embodiments the leg is pivotally attached to the frame. The leg may also be slidingly engaged with the frame. In some embodiments a slot is provided in a side member of the frame and an end of the leg is engaged with the slot. The end of the leg preferably moves between first and second ends of the slot as the frame moves between the raised and lowered positions.

The leg is preferably pivotally connected to the foot assembly.

In some embodiments the foot assembly comprises a pair of feet joined by a connecting shaft, and the leg is pivotally connected to the shaft.

The linkage mechanism preferably comprises an arm, a first end of the arm being pivotally connected to the frame and a second end of the arm being pivotally connected to the leg. In preferred embodiments a first end of the leg is pivotally connected to the frame and a second end of the leg is pivotally connected to the foot assembly, and (i) a first distance is defined between a pivot axis of the connection between the first end of the arm and the frame and a pivot axis of the connection between the second end of the arm and the leg, (ii) a second distance is defined between a pivot axis of the connection between the first end of the leg and the frame and the pivot axis of the connection between the second end of the arm and the leg, and (iii) a third distance is defined between a pivot axis of the connection between the second end of the leg and the foot assembly and the pivot axis of the connection between the second end of the arm and the leg. Preferably the first, second and third distances are the same.

In preferred embodiments the actuator is indirectly connected to the arm via a series of pivotally connected links.

Preferably, in embodiments in which the actuator is a linear actuator, the actuator and linkage mechanism is arranged such that, as a length of the linear actuator increases, an angle between the arm and the frame increases.

In preferred embodiments the frame comprises a seat having a convex bearing surface and the first end of the arm comprises a concave bearing surface. Sliding of the convex bearing surface over the concave bearing surface causes the arm to pivot with respect to the frame. The seat may be seated on a part of the foot assembly when the frame is in the lowered position. In some embodiments the foot assembly comprises a pair of feet joined by a connecting shaft, and the seat includes a concave surface and a bearing pad projecting from the concave surface, at least a part of the bearing pad being in contact with the shaft when the frame is in the lowered position.

A second aspect of the present invention provides a bed comprising:

a support for a mattress including a frame, the frame defining a support plane;

a foot assembly; and a lifting mechanism comprising a leg connecting the foot assembly to the frame; and a linkage mechanism connected between the frame and the leg and configured to allow the frame to move with respect to the foot assembly in a direction perpendicular to the support plane between a raised position and a lowered position, wherein in the lowered position the leg extends parallel to the support plane, and during movement of the frame between the raised and lowered positions the foot assembly does not move in a direction parallel to the support plane.

In preferred embodiments the foot assembly comprises a pair of feet joined by a connecting shaft, the leg is pivotally connected to the shaft, and each of the feet comprises at least one wheel, each wheel being rotatable about an axle and an axis of the shaft lying in the same plane as the axles.

In some embodiments the bed may include two foot assemblies, a first foot assembly comprising a first pair of feet proximate a first end of the bed and a second foot assembly comprising a second pair of feet proximate a second end of the bed. The lifting mechanism may then comprise a first actuator arranged to apply a force to both of the linkage mechanisms associated with the first pair of feet and a second actuator arranged to apply a force to both of the linkage mechanisms associated with the second pair of feet.

The frame preferably comprises a side member extending between first and second ends of the bed, and the leg is preferably connected to the side member. The side member may include a channel extending in a length direction along the side member and the leg then preferably includes a carriage member engaged with the channel, such that, as the support frame moves between the raised and lowered positions, the carriage member slides along the channel between first and second ends of the channel. In preferred embodiments the first end of the channel is nearer an end of the side member than the second end of the channel, and the arm is connected to the side member between the first end of the channel and the end of the side member.

BRIEF DESCRIPTION OF THE DRAWINGS

The invention will now be further described by way of example only and with reference to the accompanying drawings, in which.

DESCRIPTION OF THE PREFERRED EMBODIMENTS

Figure 1A:
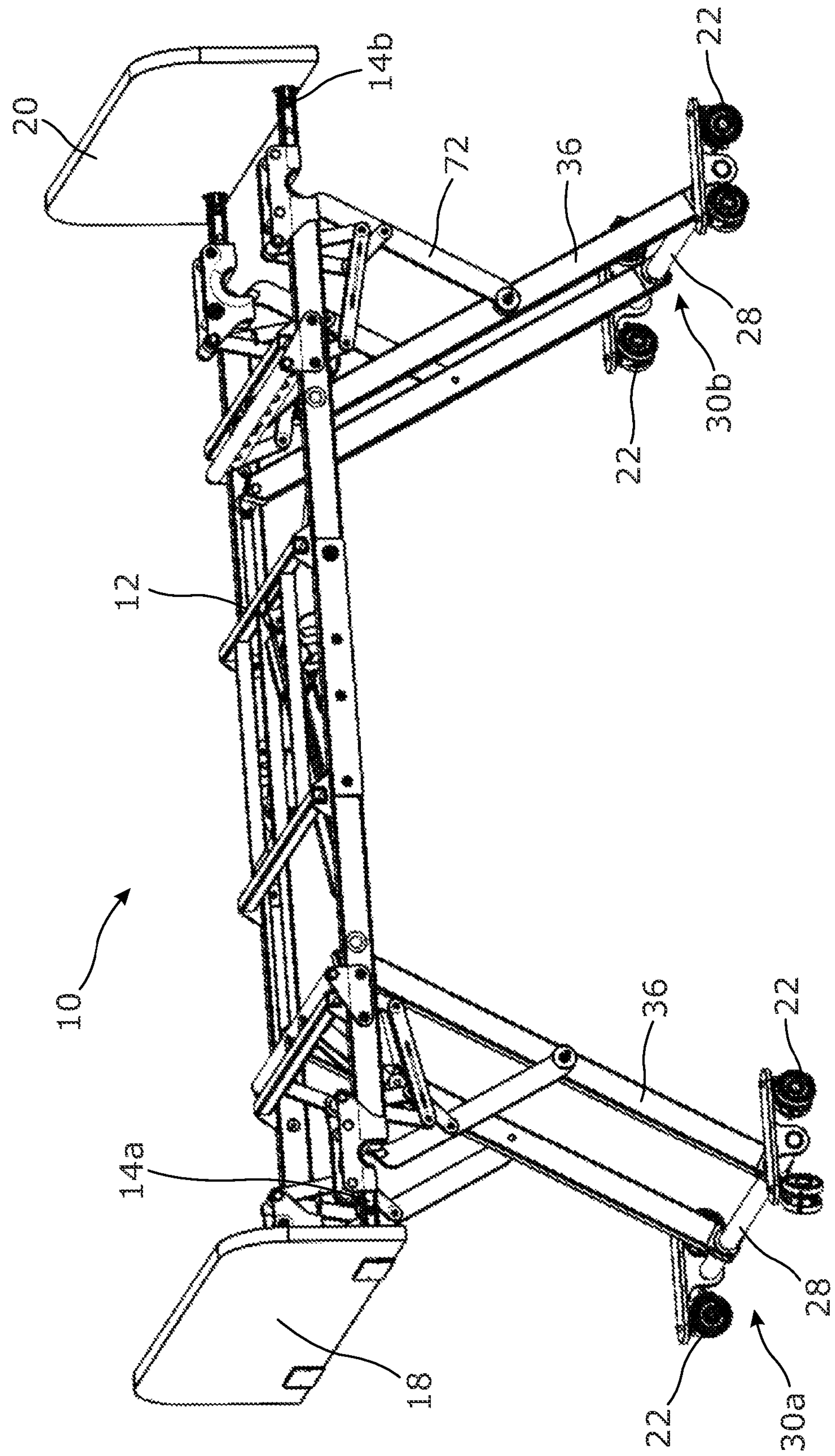
FIGS. 1*a*, 1*b* and 1*c* are perspective views of a bed frame including a lifting mechanism according to the present invention in raised, partially lowered and lowered configurations respectively.

A bed 10 according to a preferred embodiment of the present invention is shown in FIGS. 1 to 3.

The bed 10 comprises a support frame 12 for supporting a mattress. The frame 12 extends in a length direction between first and second ends 14*a*, 14*b*. The support frame 12 defines a support plane of the bed 10. A mattress (not shown) may be supported directly on the support frame 12, or may be supported on an additional mattress frame (not shown) that is connected to or supported by the support frame 12. A headboard 18 is attached to and extends from the support frame 12 at the first end 14*a* of the frame 12 and a footboard 20 is attached to and extends from the support frame 12 at the second end 14*b* of the frame 12.

Figure 3A:
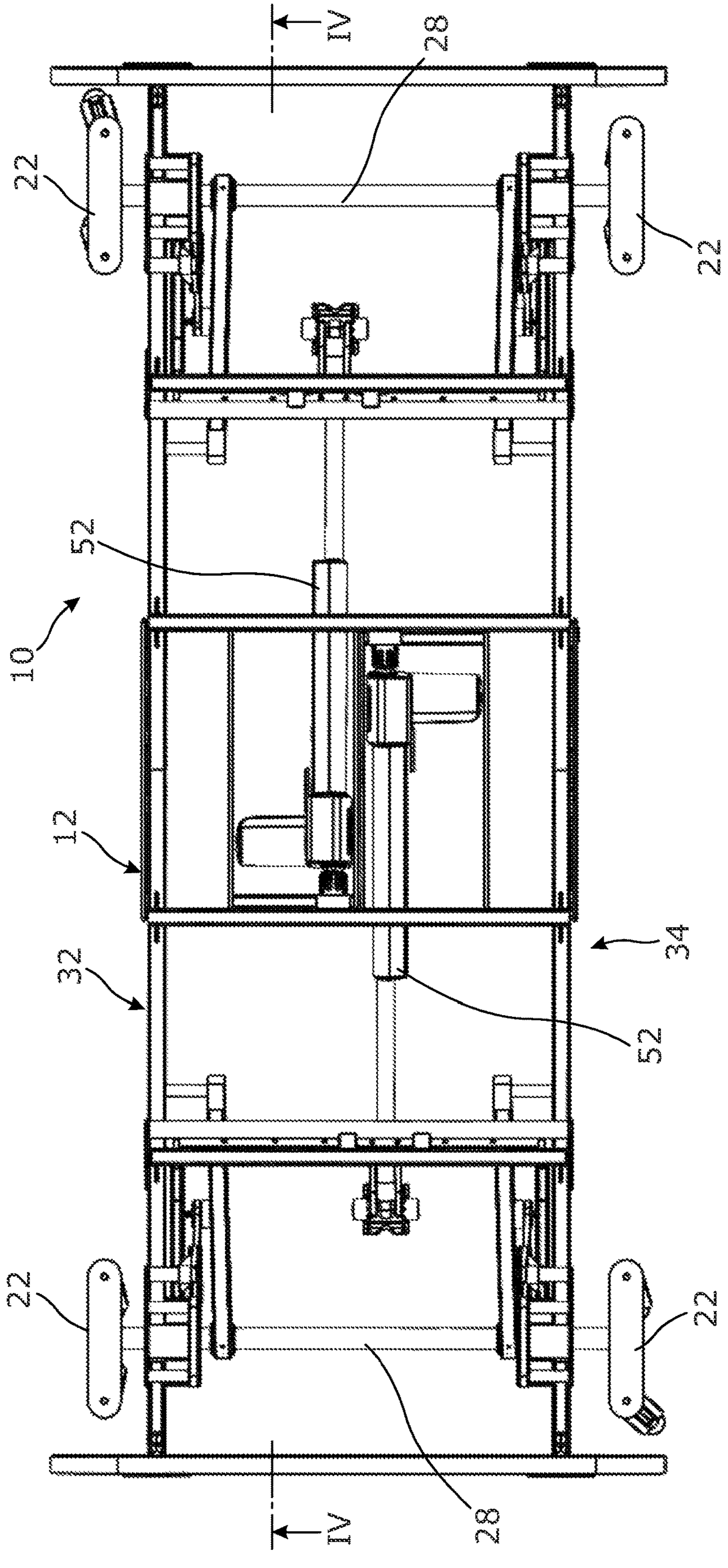
FIGS. 3*a*, 3*b* and 3*c* are plan views from above of the bed frame of FIG. 1 in raised, partially lowered and lowered configurations respectively.
Figure 3B:
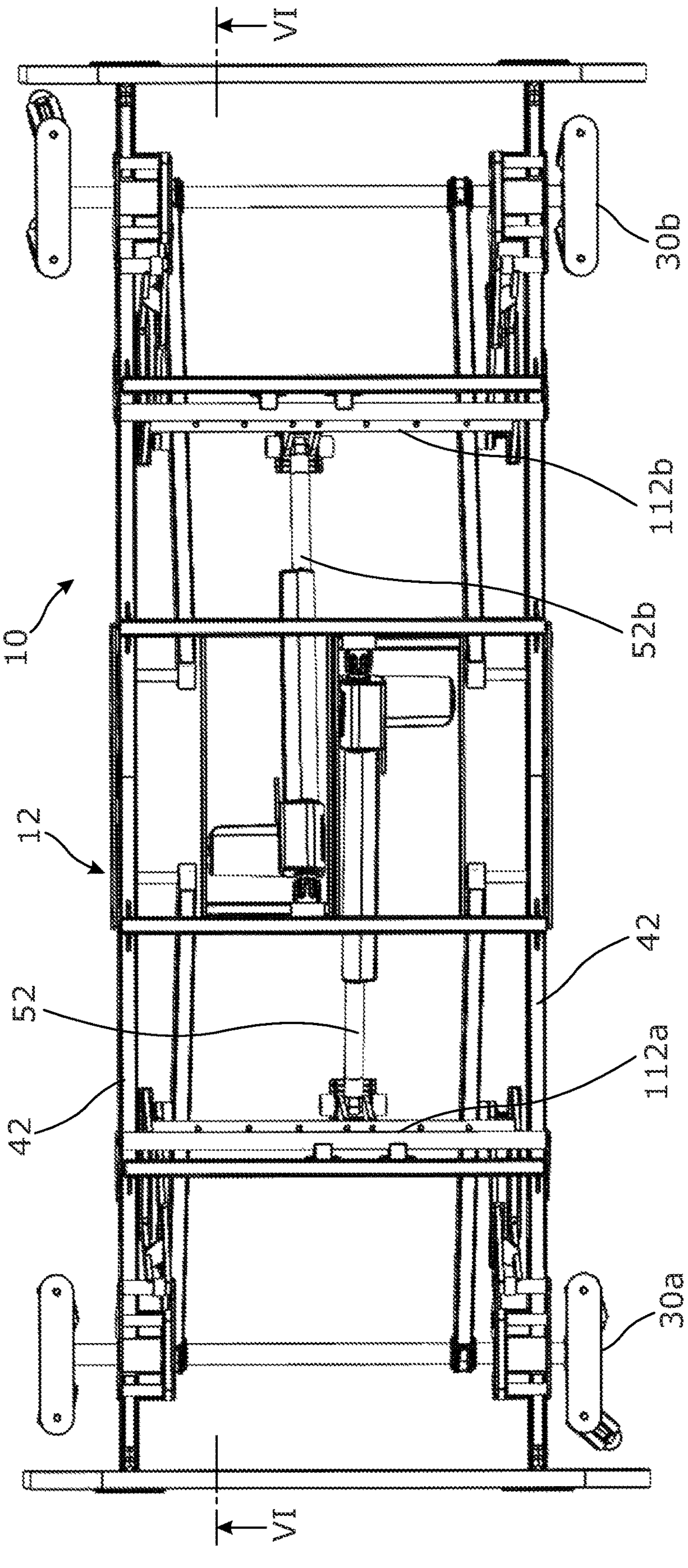

The bed 10 comprises four feet 22. As shown most clearly in FIGS. 16 and 17, each foot 22 includes a trolley 24 to which two wheels or casters 26 are attached. A first pair of feet 22 is disposed proximate the first end 14*a* of the frame 12 and a second pair of feet 22 is disposed proximate the second end 14*b* of the frame 12. Referring now to FIGS. 3*a* and 3*b*, in this embodiment the two feet 22 of the first pair are connected by an elongate shaft 28 to form a first foot assembly 30*a*. Similarly the two feet 22 of the second pair are connected by an elongate shaft 28 to form a second foot assembly 30*b*. In this way, a first foot 22 of each foot assembly 30 is disposed proximate a first side 32 of the bed 10 and a second foot 22 of each foot assembly 30 is disposed proximate a second side 34 of the bed 10.

Figure 1B:
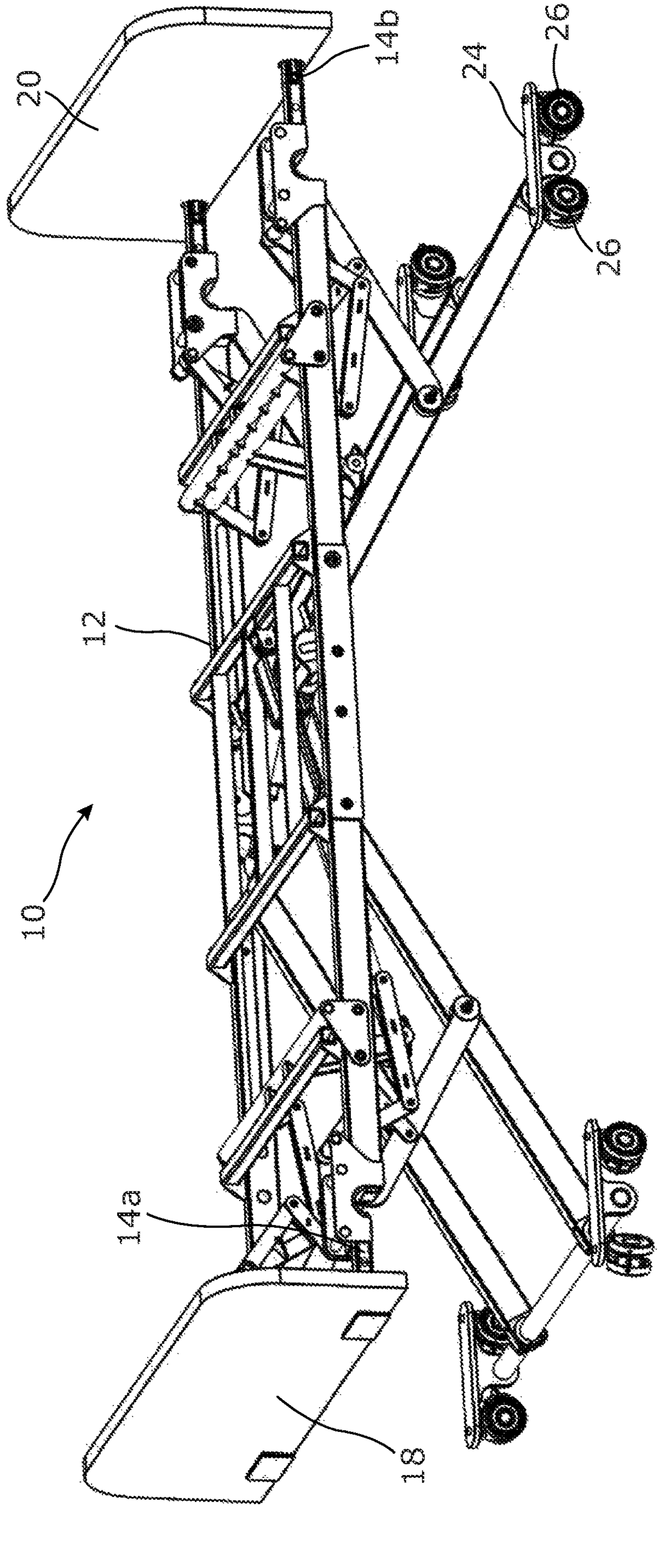
Figure 1C:
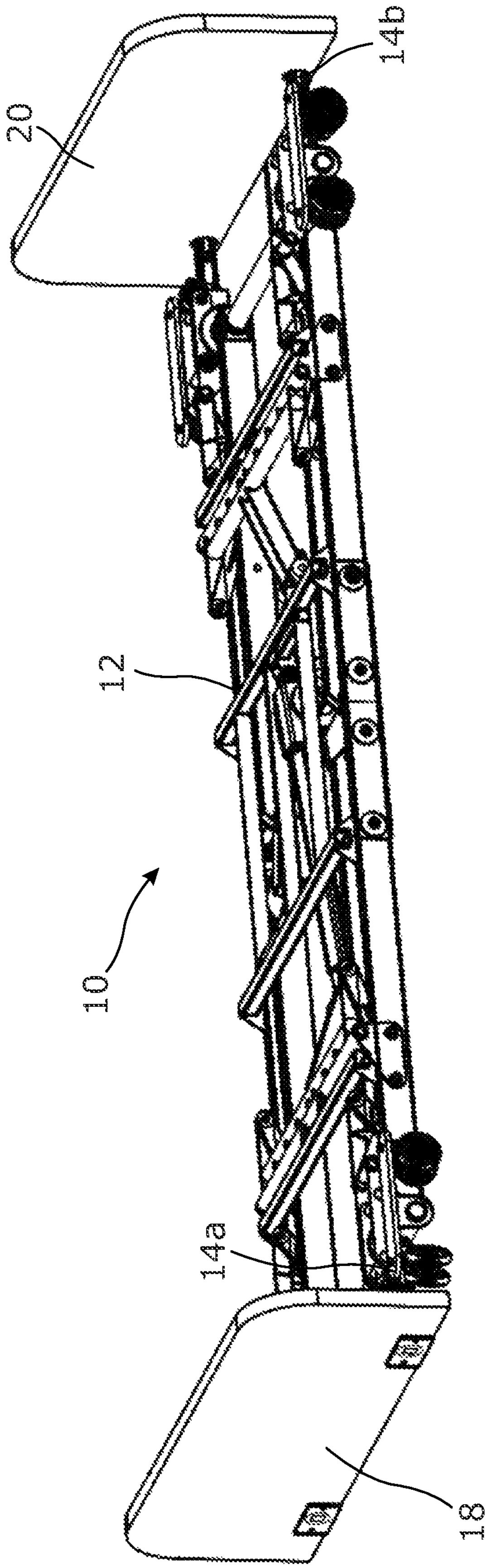
Figure 2A:
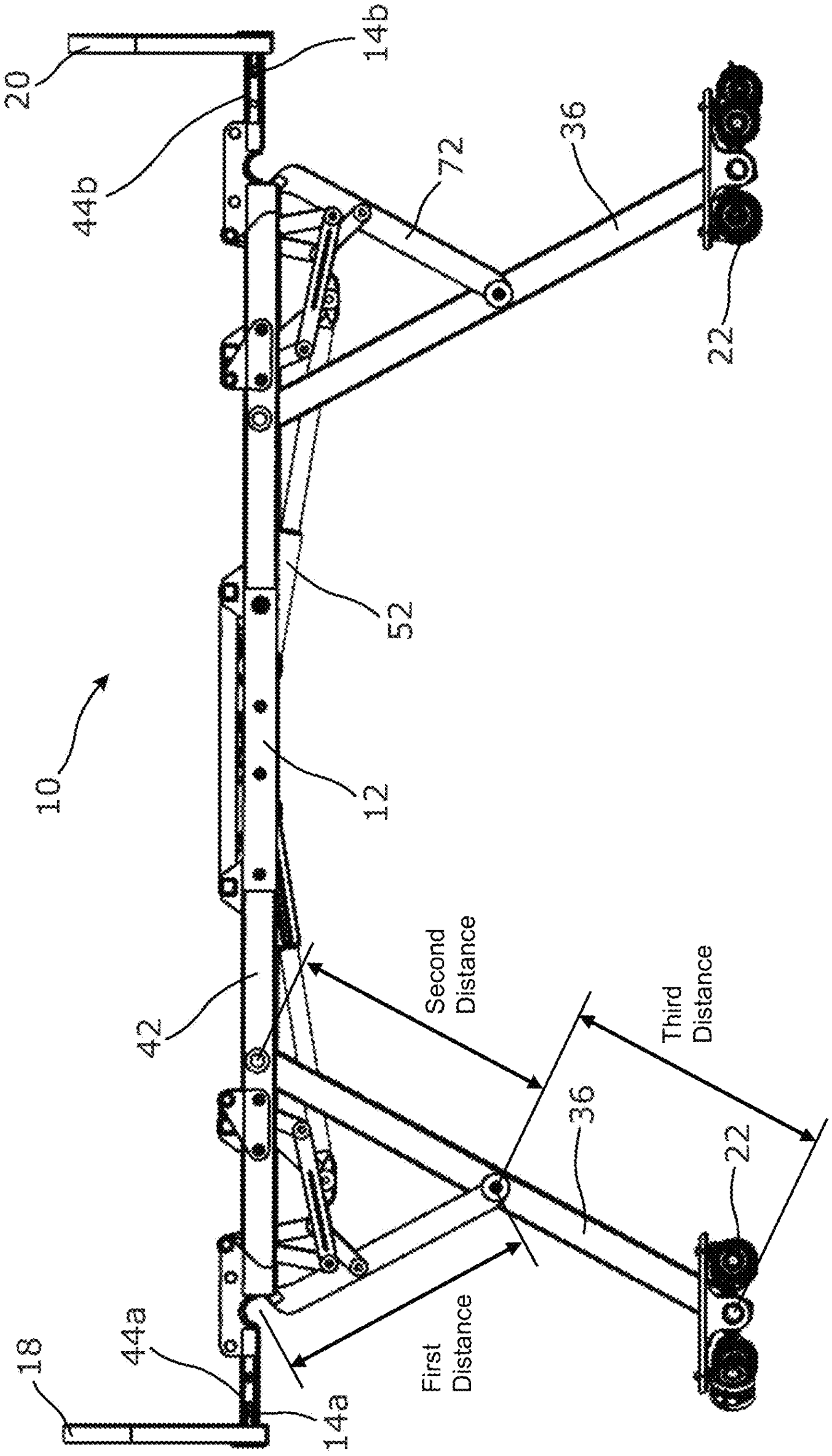
FIGS. 2*a*, 2*b* and 2*c* are side views of the bed frame of FIG. 1 in raised, partially lowered and lowered configurations respectively.
Figure 2B:
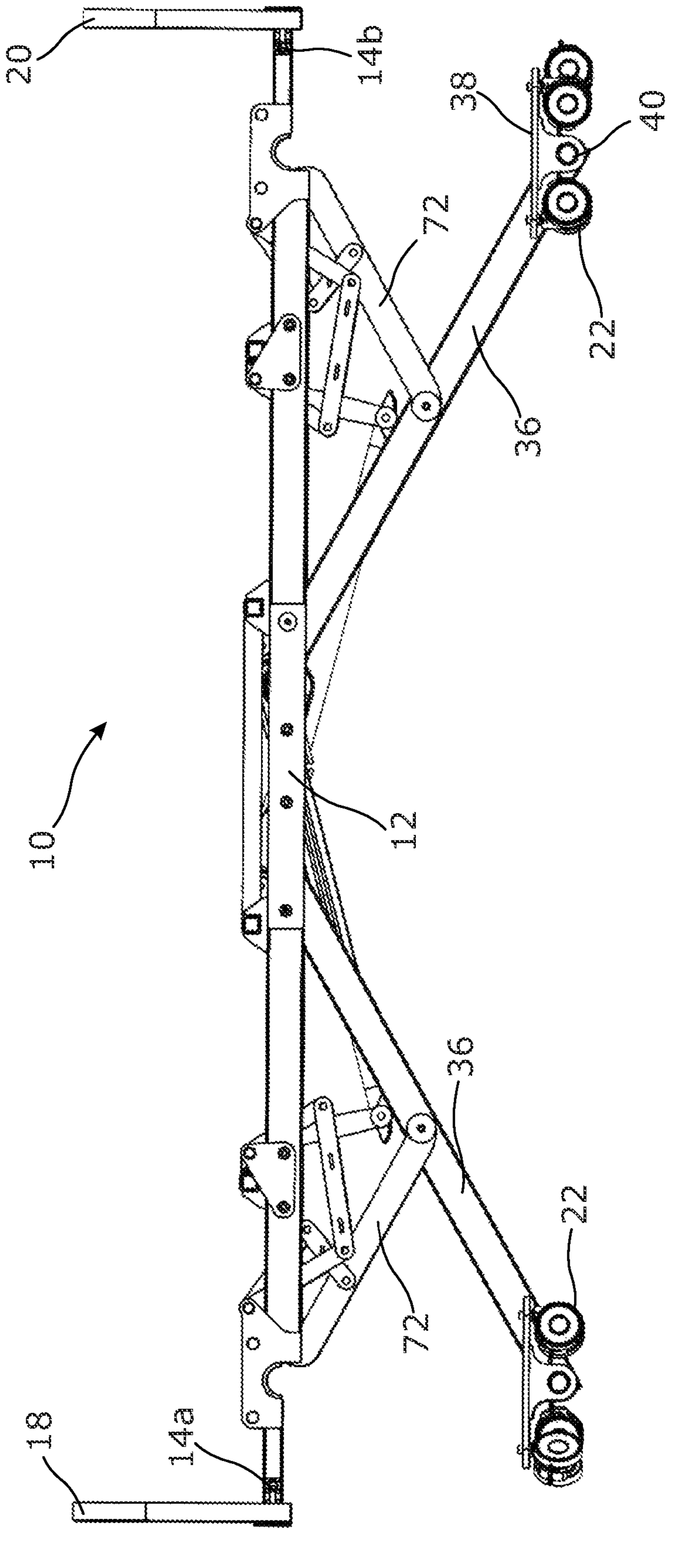
Figure 2C:
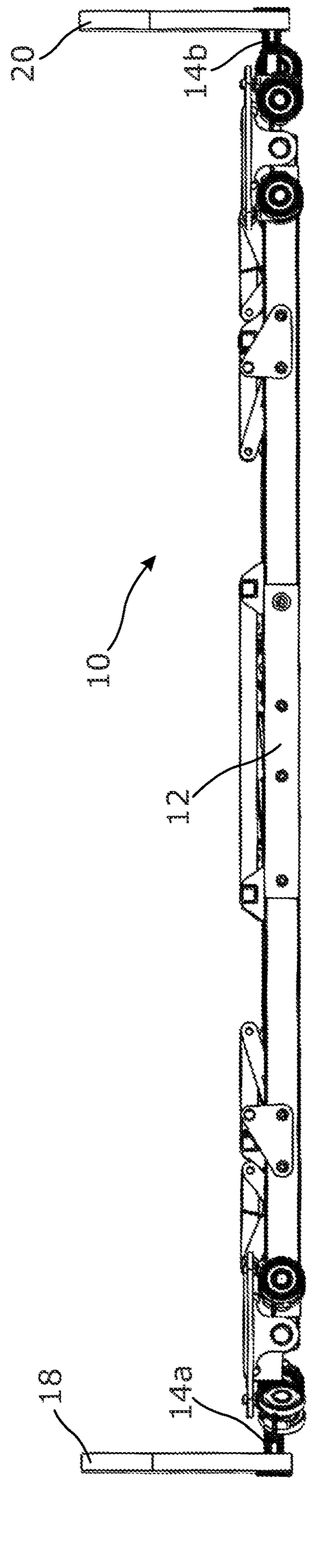
Figure 3C:
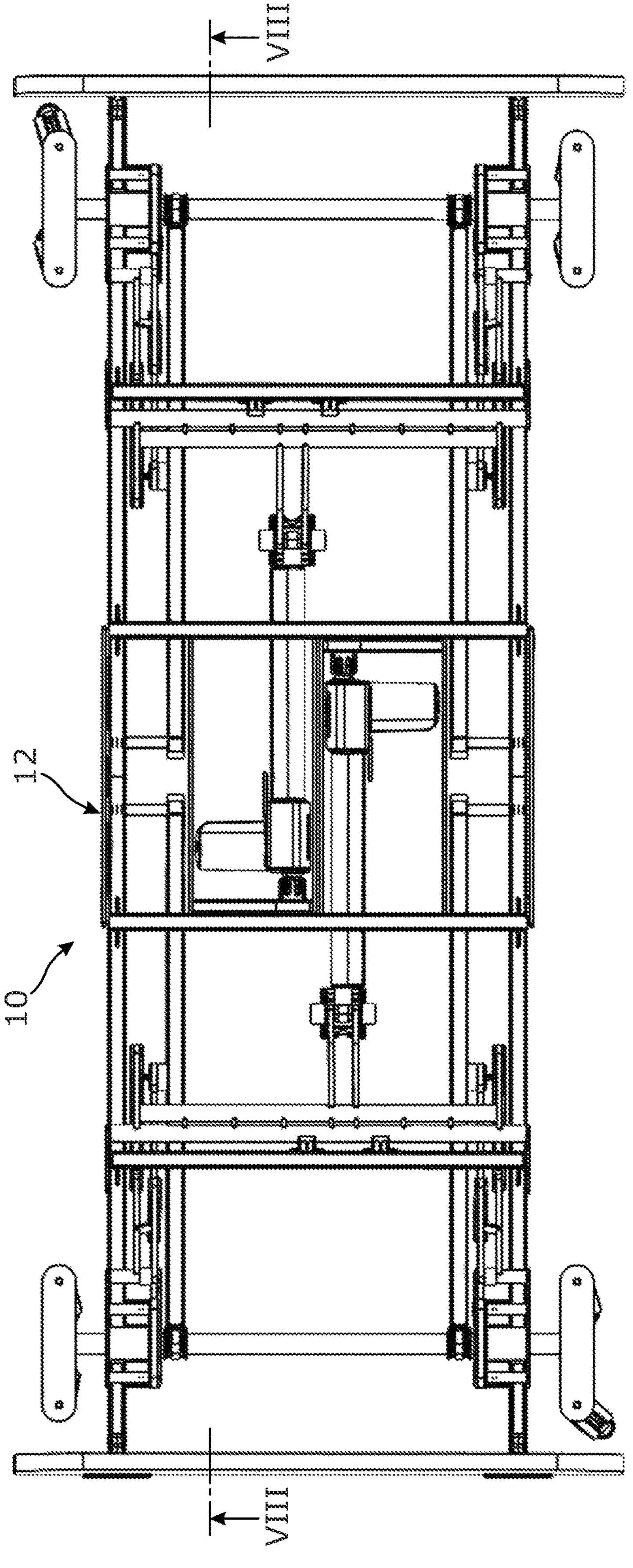
Figure 4:
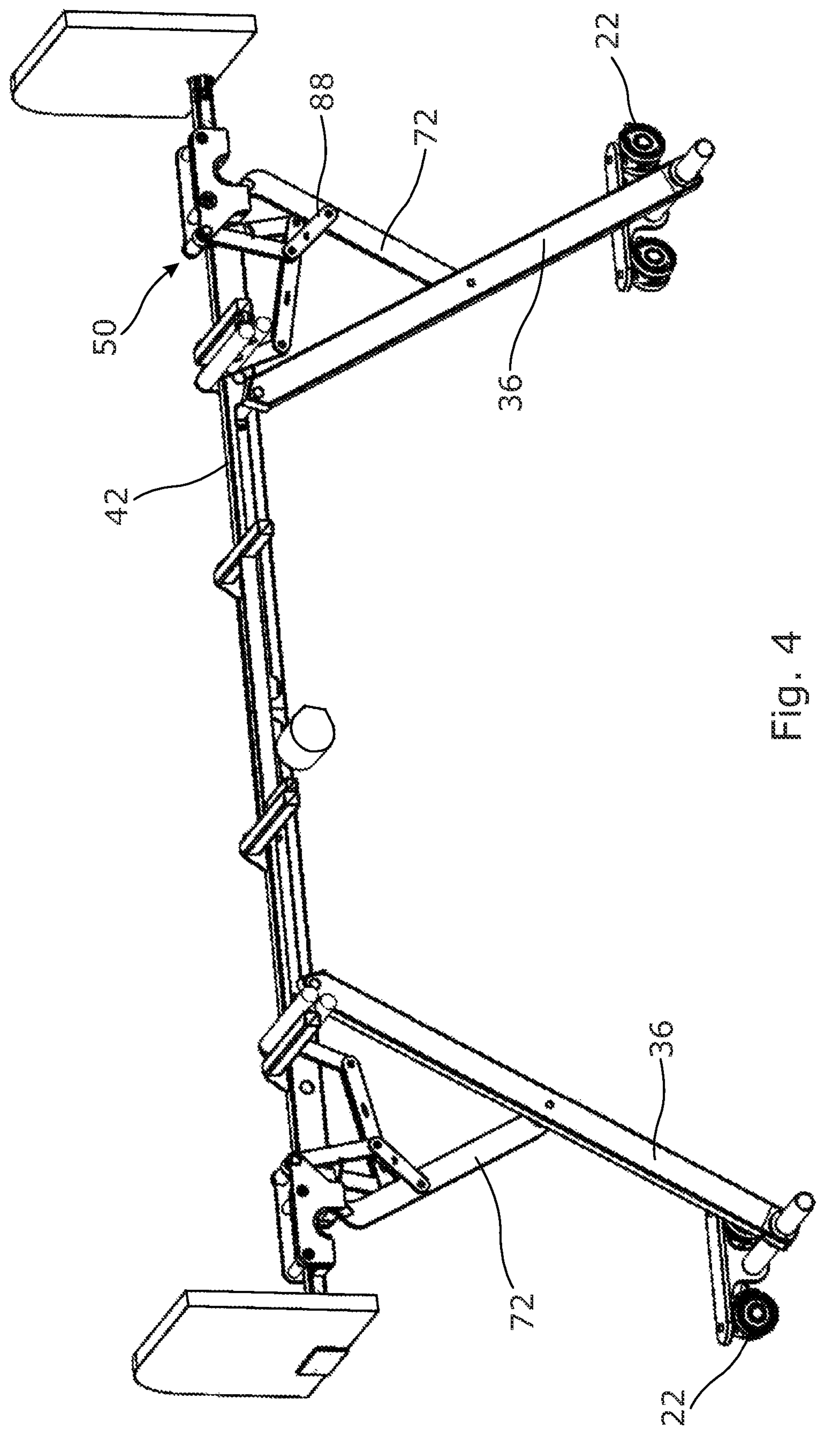
FIG. 4 is a perspective sectional view of the bed frame of FIG. 1*a* along the line IV-IV of FIG. 3*a*, showing the lifting mechanism at one side of the bed frame.

Each of the feet 22 is connected to the support frame 12 by a leg 36. The legs 36 are configured to allow the support frame 12 to move with respect to the feet 22 between a raised position, illustrated in particular in FIGS. 1*a* and 2*a*, and a lowered position, illustrated in particular in FIGS. 1*c* and 2*c*. FIGS. 1*b* and 2*b* show the bed 10 with the support frame 12 in a partially raised (or partially lowered) position with respect to the feet 22. Preferably, each leg 36 is both pivotally attached to the support frame 12 and pivotally attached to the respective foot assembly 30.

In this embodiment the connection between each leg 36 and the support frame 12 permits movement of the leg 36 with respect to the support frame 12 such that the support frame 12 can be moved between the raised and lowered positions without a distance between the first and second foot assemblies 30*a*, 30*b* changing. In other words, the bed 10 may be raised and lowered without the feet 22 moving.

In other embodiments the feet may move as the bed is raised and lowered. Preferably movement of the feet is limited so as not to destabilise the bed.

As shown most clearly in FIGS. 1*b* and 2*b*, each foot trolley 24 comprises an upper plate 38, to which the two casters 26 are attached, and a shaft support 40 which extends from the upper plate 38 between the two casters 26. An end of the shaft 28 is connected to the shaft support 40 such that an axis of the shaft 28 lies in substantially the same plane as the rotational axes of the axles of the casters 26. As will be described further below, this has the advantage that the bed 10 may be lowered very close to the floor, as shown most clearly in FIG. 2*c*.

The support frame 12 comprises two elongate side members 42. Each side member 42 extends between first and second ends 44*a*, 44*b* and defines a length of the bed 10 between the footboard 20 and the headboard 18. An attachment member 48 is provided at each of the first and second ends 44*a*, 44*b* to enable the attachment of the side member 42 to the respective footboard 20 or headboard 18. A distance between the side members 42 defines a width of the mattress support.

The shafts 28 of the first and second foot assemblies 30 extend perpendicularly to the side members 42 of the support frame 12. A length of the shaft 28 connecting the feet 22 of each of the foot assemblies 30 is preferably greater than the distance between the side members 42 of the support frame 12. As shown most clearly in FIGS. 3*a-c*, the feet 22 of each pair are therefore further apart than the width of the mattress support, such that the feet 22 are disposed outside the width of the support frame 12.

In this embodiment a width of each of the headboard 18 and the footboard 20 is also greater than the distance between the side members 42 of the support frame 12, and is greater than the distance between the pairs of feet 22 in each of the foot assemblies 30. In this way, the width of each of the headboard 18 and the footboard 20 defines an overall width of the bed 10.

Each of the legs 36 is connected to the respective side member 42 of the support frame 12 by a mechanical linkage 50. The mechanical linkage 50 is configured to permit the support frame 12 to be moved between the raised and lowered positions. The mechanical linkage 50 further allows the leg 36 to extend parallel to or substantially parallel to the support plane when the support frame 12 is in the lowered position such that the bed 10 may be fully lowered to the ground or floor on which the bed 10 is standing.

An actuator 52 is arranged to apply a force to the mechanical linkage 50 to move the support frame 12 between the lowered and raised positions. In this embodiment the actuator 52 is a linear actuator and is, in particular, in the form of a piston comprising a piston rod 54. Because in this embodiment the bed 10 comprises a first foot assembly 30*a* and a second foot assembly 30*b*, a first actuator 52*a* is arranged to apply a force to the mechanical linkage 50 associated with both of the legs 36 connected to the pair of feet 22 of the first foot assembly 30*a*, and a second actuator 52*b* is arranged to apply a force to the mechanical linkage 50 associated with both of the legs 36 connected to the pair of feet 22 of the second foot assembly 30*b*.

The legs 36, mechanical linkages 50 and actuators 52 together provide a lifting mechanism that allows the bed 10 to be raised and lowered.

Figure 5:
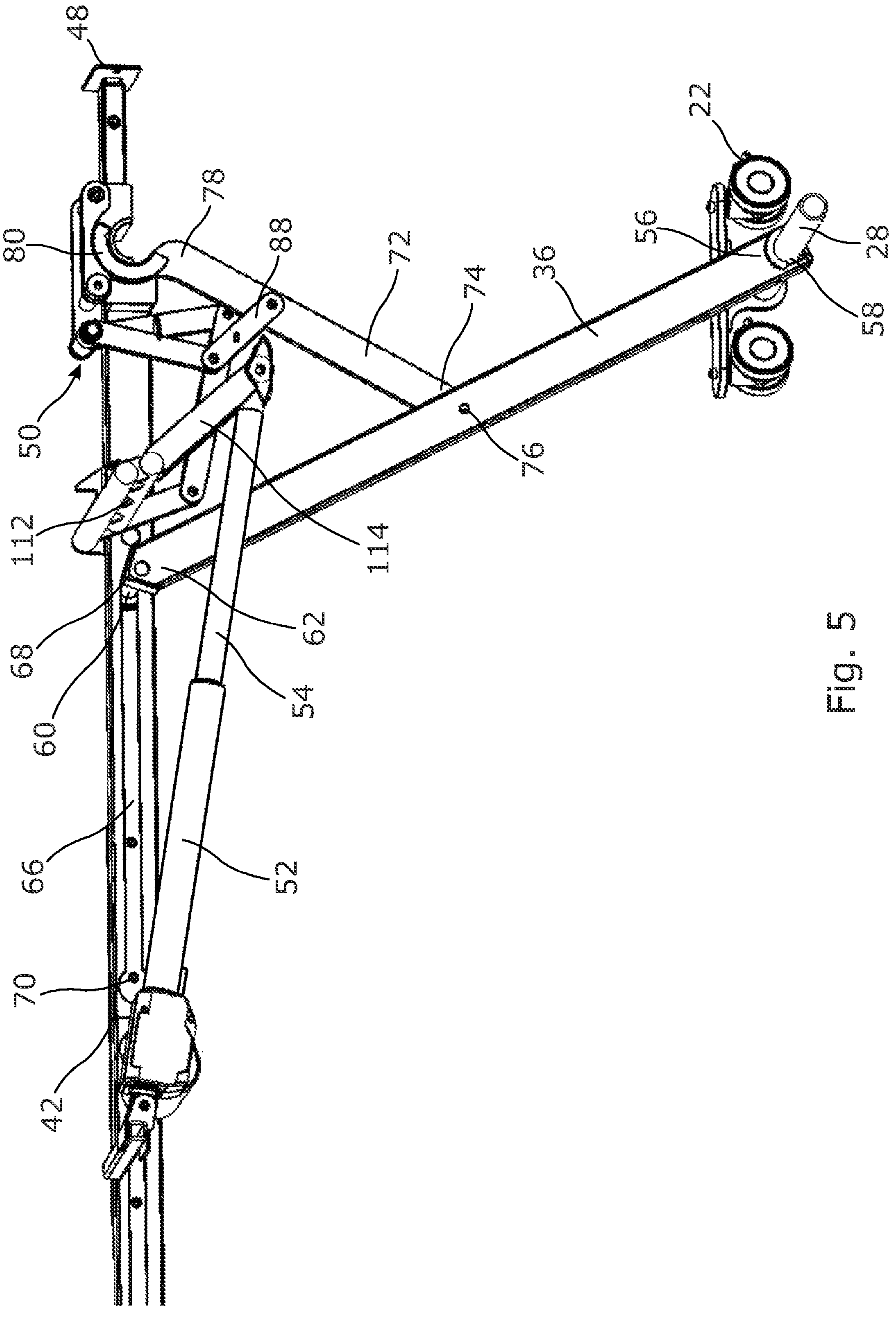
FIG. 5 shows a part of the lifting mechanism of FIG. 4.
Figure 6:
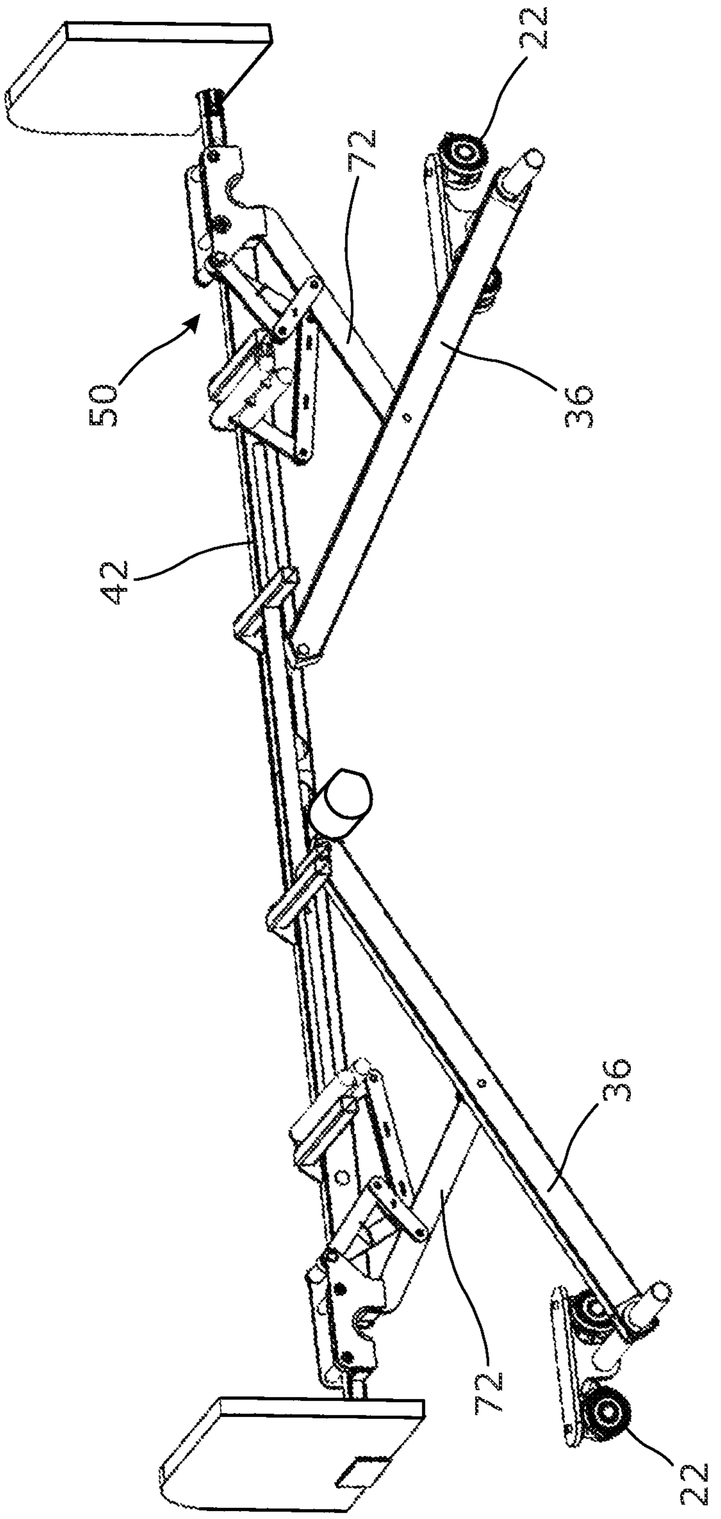
FIG. 6 is a perspective sectional view of the bed frame of FIG. 1*b* along the line VI-VI of FIG. 3*b*, showing the lifting mechanism at one side of the bed frame.
Figure 7:
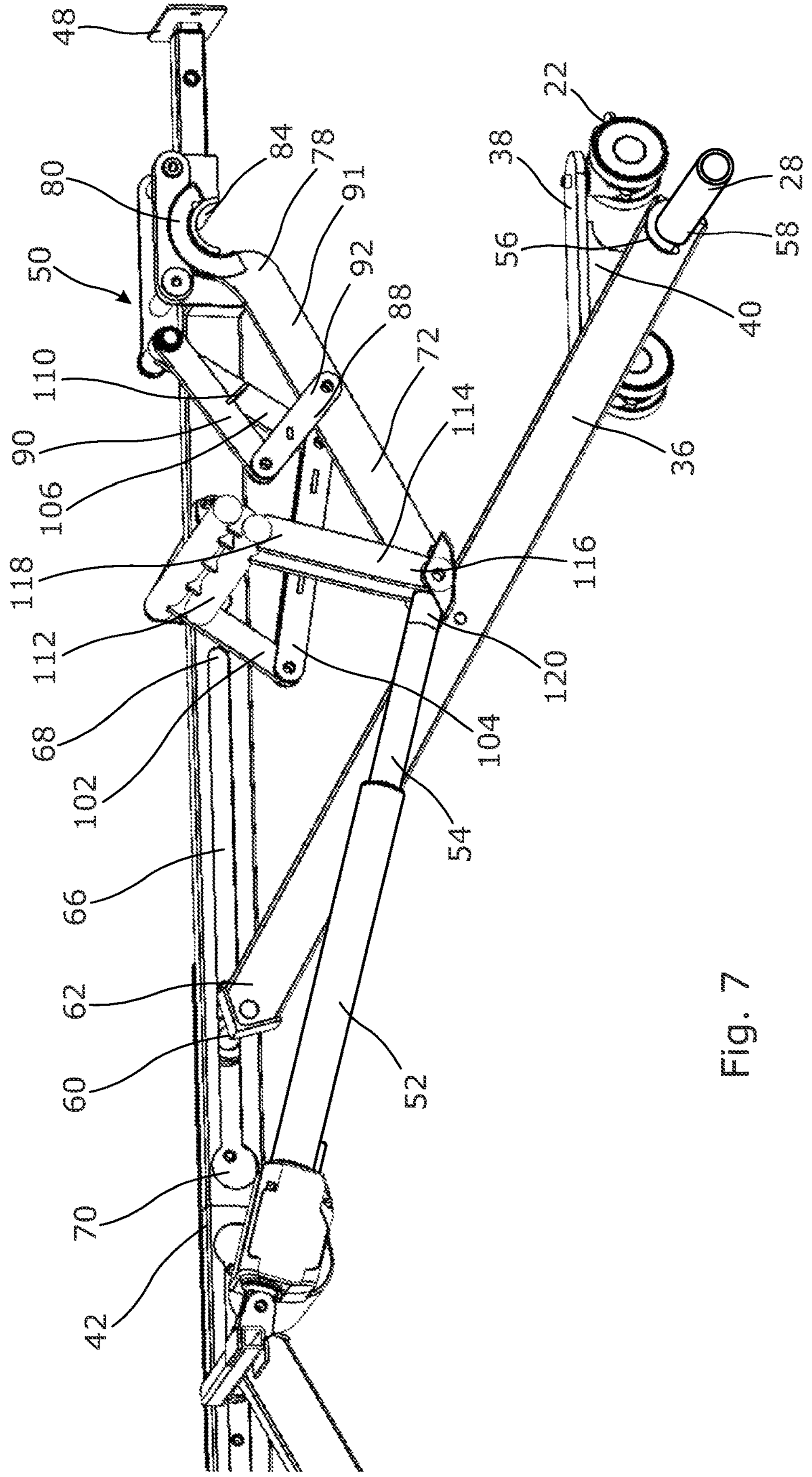
FIG. 7 shows a part of the lifting mechanism of FIG. 6.
Figure 8:
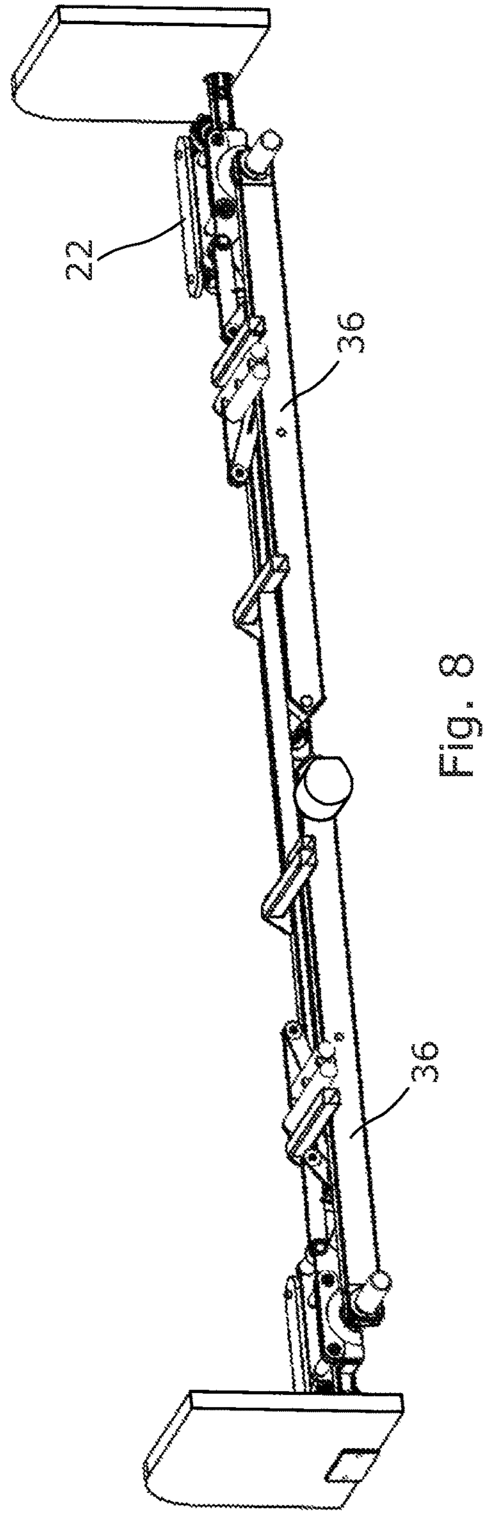
FIG. 8 is a perspective sectional view of the bed frame of FIG. 1*c* along the line VIII-VIII of FIG. 3*c*, showing the lifting mechanism at one side of the bed frame.
Figure 12:
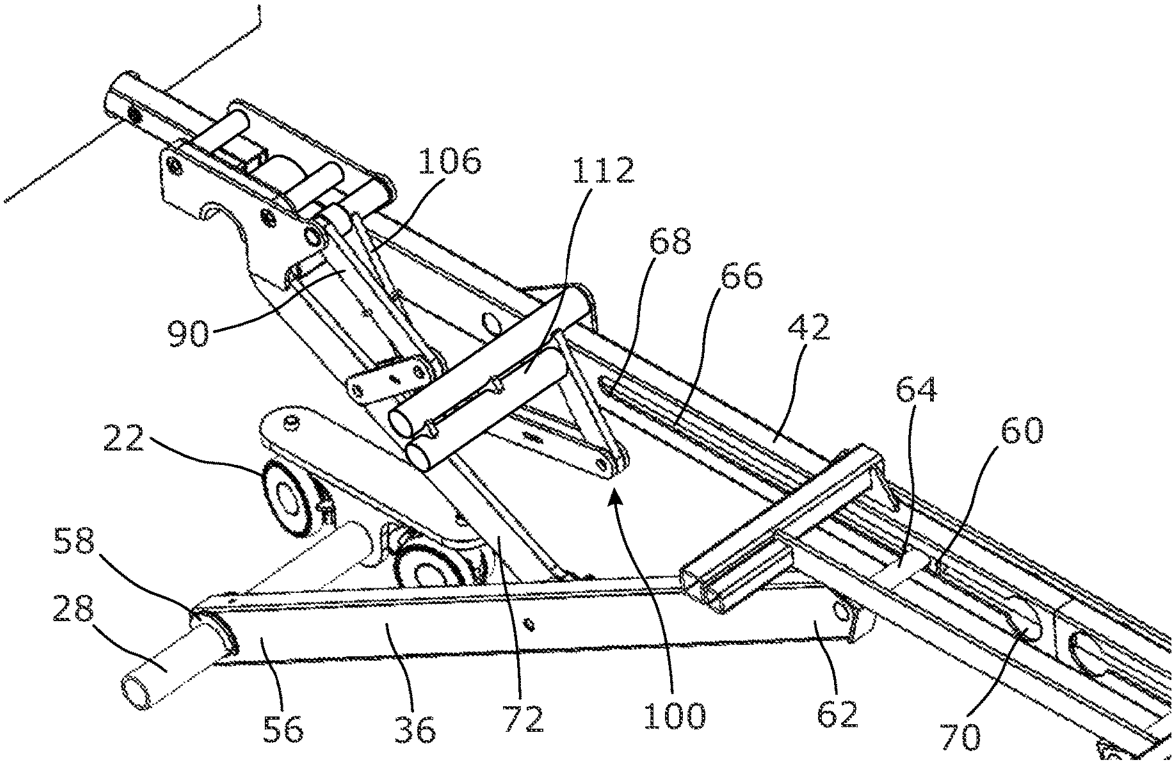
FIGS. 12 and 13 show an upper part of the lifting mechanism of the present invention, with the mechanism in a partially lowered configuration.
Figure 13:
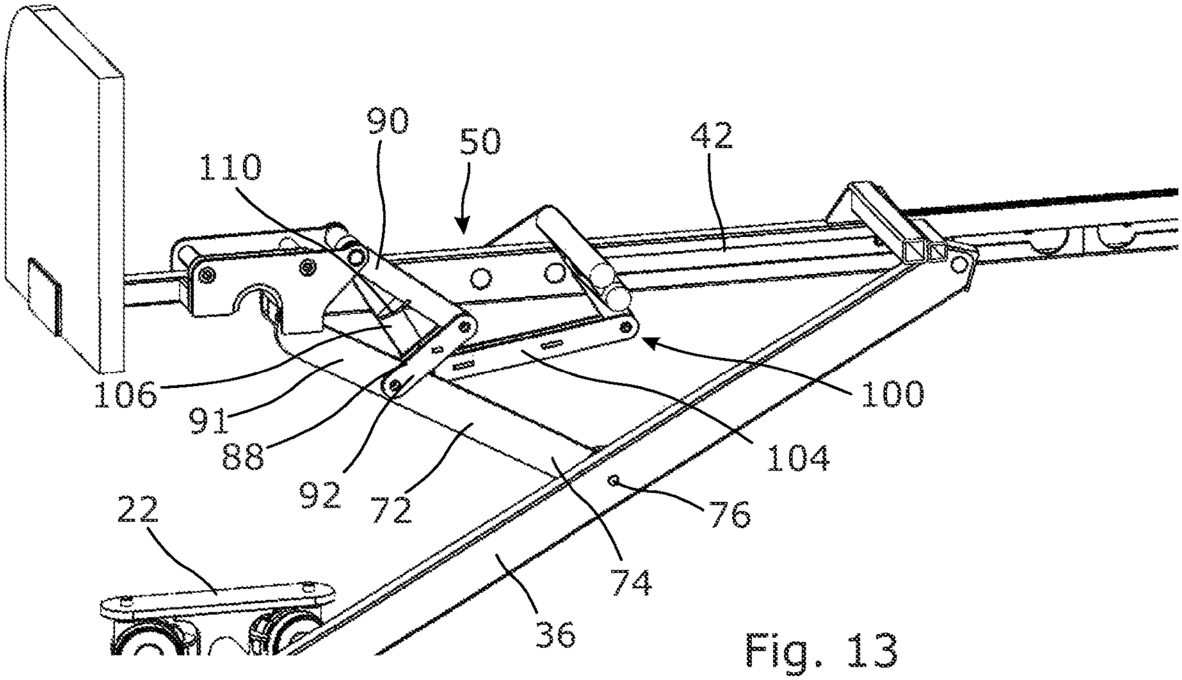
Figure 14:
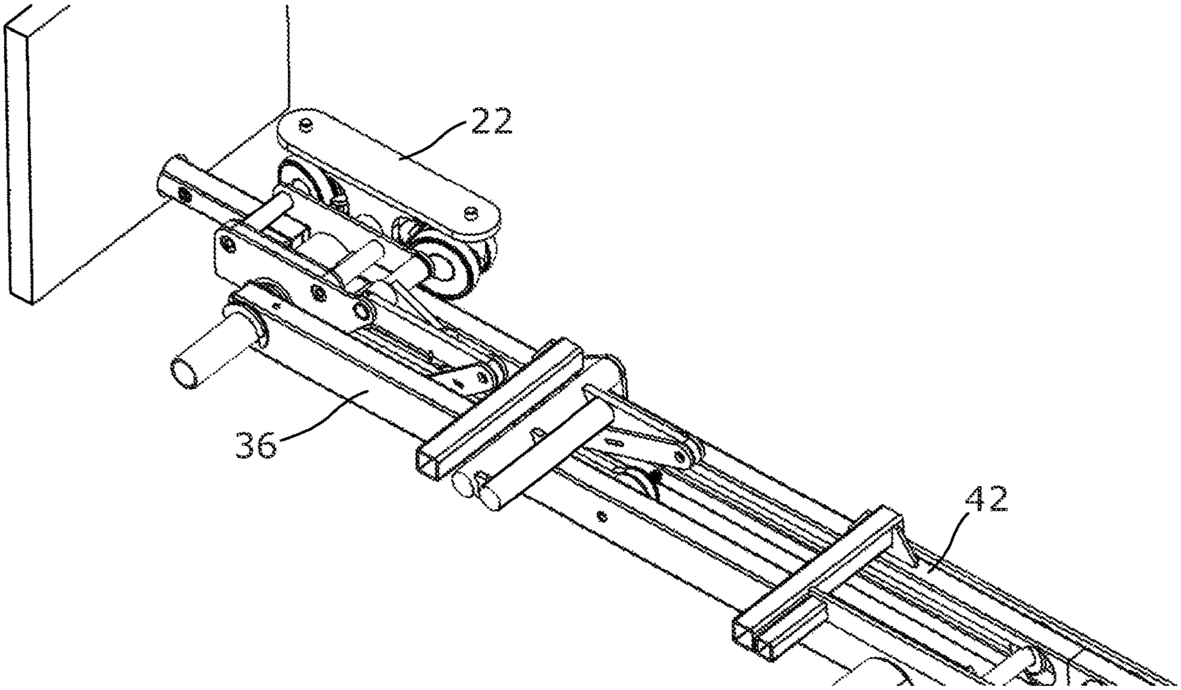
FIGS. 14 and 15 show an upper part of the lifting mechanism of the present invention, with the mechanism in a lowered configuration.
Figure 15:
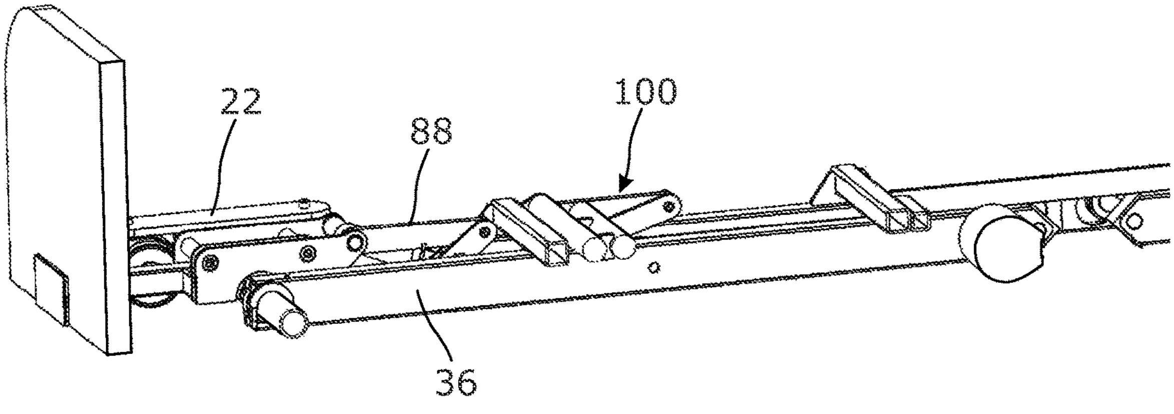

Referring now, in particular, to FIGS. 5, 7 and 12, in this embodiment each of the legs 36 is connected at a first end 56 to the shaft 28 of the foot assembly 30. The first end 56 of each leg 36 is pivotally or rotatably connected to the foot assembly 30. In particular, a hole 58 is provided at the first end 56 of the leg 36 through which the shaft 28 extends, such that the leg 36 is able to rotate or pivot about the shaft 28. In particular the leg 36 rotates about an axis of the shaft 28.

A carriage member 60 is connected to a second end 62 of each of the legs 36. The carriage member 60 is in the form of a wheel or roller that is attached to the leg 36 by a rod 64 such that the carriage member 60 is spaced from the leg 36.

An elongate slot or channel 66 is provided in the side member 42 of the support frame 12. The channel 66 extends along the length of the side member 42 and is provided in an inner face of the side member 42. The channel 66 is configured to receive the carriage member 60. The channel 66 is further configured to retain the carriage member 60 such that during operation of the lifting mechanism translational movement of the carriage member 60 is only along the length of the channel 66. In this embodiment the carriage member 60 is fully received in the channel 66 and the rod 64 connecting the carriage member 60 to the leg 36 extends from the channel 66.

When the support frame 12 is in the raised position the carriage member 60 is disposed at or proximate a first end 68 of the channel 66. When the support frame 12 is in the lowered position the carriage member 60 is disposed at or proximate a second end 70 of the channel 66. The first end 68 of the channel 66 is disposed nearer to the respective first or second end 14*a*, 14*b* of the support frame 12 than the second end 70 of the channel 66. The second end 62 of the leg 36 is therefore slidingly engaged with the support frame 12.

The leg 36 is also able to rotate about its second end 62 such that an angle between the leg 36 and the support frame 12 changes. In this embodiment, because the carriage member 60 is in the form of a roller the carriage member 60 is able to rotate within the channel 66 as the angle of the leg 36 changes with respect to the support frame 12. This means that the leg 36 rotates about an axis of the rod 64 connecting the carriage member 60 to the leg 36. The rotational axis is perpendicular to the side member 42 of the support frame 12. In other embodiments the carriage member 60 may be connected to the leg 36 in such a manner as to permit rotation of the leg 36 about that connection.

The mechanical linkage 50 comprises a drive linkage mechanism 100 and a leg linkage mechanism 88. The drive linkage mechanism 100 connects the actuator 52 to the support frame 12. The leg linkage mechanism 88 connects the support frame 12 to the leg 36. Additionally an output link or output lever 106 of the drive linkage mechanism 100 is coupled or connected to an input link or input lever 90 of the leg linkage mechanism 88. This coupling is such that movement of the output link 106 is transmitted directly to the input link 90. In this way the drive linkage mechanism 100 and leg linkage mechanism 88 are configured such that a force applied by the actuator 52 is transmitted to the leg 36.

The leg linkage mechanism 88 comprises the leg input link or leg input lever 90, a leg output link or leg output lever 91, and a leg coupler 92 extending between and coupling the leg input link 90 and the leg output link 91.

In this embodiment the leg output link 91 is provided by an arm 72 connected to each leg 36. The arm 72 is elongate and a first end 74 of the arm 72 is pivotally or rotatably connected to the leg 36 midway along the length of the leg 36. A pivot member 76 connecting the first end 74 of the arm 72 and the leg 36 is disposed halfway between the rotational axis at the first end 56 of the leg 36 and the rotational axis at the second end 62 of the leg 36. In this way a distance between the rotational axis at the first end 56 of the leg 36 and the pivotal connection between the arm 72 and the leg 36 is the same as the distance between the rotational axis at the second end 62 of the leg 36 and the pivotal connection between the arm 72 and the leg 36.

A second end 78 of the arm 72 is connected to the respective side member 42 of the support frame 12. The arm 72 extends from the leg 36 in a direction substantially towards the end 14 of the support frame 12, and the second end 78 of the arm 72 is connected to the side member 42 at a point between the first end 68 of the channel 66 and the end 44 of the side member 42. The second end 78 of the arm 72 is pivotally or rotatably connected to the side member 42. In this embodiment the second end 78 of the arm 72 comprises a saddle portion 80. The saddle portion 80 comprises a curved section of the arm 72 having a concave bearing surface 82. The concave bearing surface 82 faces in a generally downwards direction towards the foot 22 of the bed 10.

Figure 17:
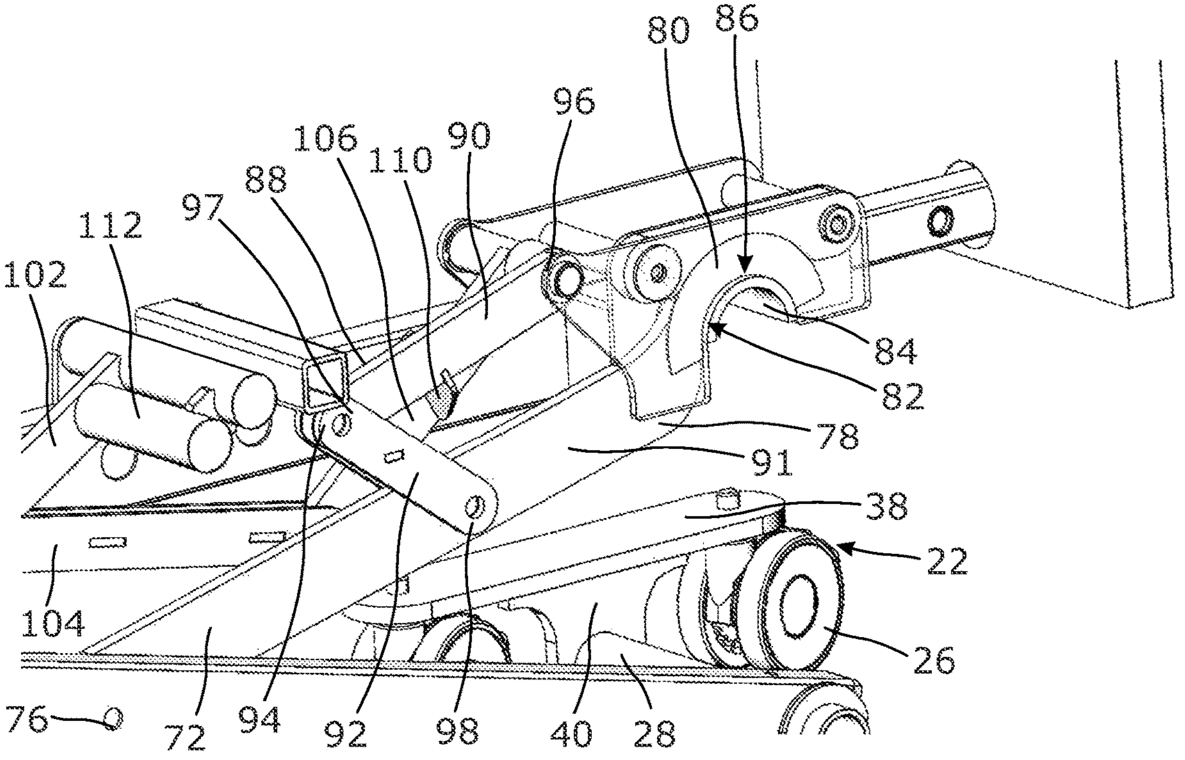
FIG. 17 is a detailed view of a part of the linkage mechanisms, showing in particular a leg linkage mechanism and arm pivot arrangement.

As illustrated most clearly in FIG. 17, the saddle portion 80 of the arm 72 engages with a seat 84 attached to the side member 42 of the support frame 12. The seat 84 is in the form of a part cylindrical member having a concave curved surface and an opposite convex curved surface. The seat 84 is attached to the side member 42 in a fixed position with the concave surface facing downwards towards the foot 22 of the bed 10. The convex surface provides a bearing surface 86 of the seat 84.

The saddle portion 80 of the arm 72 is engaged with the seat 84 such that the bearing surfaces 82, 86 of the saddle portion 80 and seat 84 are in contact. As the support frame 12 is moved between the raised and lowered positions, the bearing surfaces 82, 86 slide over each other to allow the arm 72 to pivot about the seat 84. The axis of rotation is co-axial with the axis of the part cylindrical member.

In this embodiment the position of the seat 84 with respect to the end 44 of the side member 42 is such that when the support frame 12 is in the lowered position, the seat 84 is seated on the shaft 28 of the foot assembly 30. The curvature and the dimensions of the seat 84 are, therefore, such that the shaft 28 is received in the part cylindrical member of the seat 84, with at least a part of the concave surface in contact with the shaft 28 when the support frame 12 is in the lowered position.

Furthermore, when the support frame 12 is in the lowered position, the axis of the part cylindrical member is co-axial with the axis of the shaft 28.

Preferably, the following three distances are the same:

(i) the distance between the axis of rotation at the second end 78 of the arm 72 and the pivot member at the first end 74 of the arm 72;

(ii) the distance between the rotational axis at the first end 56 of the leg 36 and the pivotal connection between the arm 72 and the leg 36; and (iii) the distance between the rotational axis at the second end 62 of the leg 36 and the pivotal connection between the arm 72 and the leg 36.

The leg input link 90 comprises an elongate member extending between a first end 96 and a second end 94. The first end 96 of the leg input link 90 is pivotally connected to a part of the support frame 12. A first end 97 of the leg coupler 92 is pivotally connected to the second end 94 of the leg input link 90. A second end 98 of the leg coupler 92 is pivotally or rotatably connected to the arm 72. Each of the pivotal connections of the leg linkage mechanism 88 has an axis of rotation that extends perpendicular to the side member 42 of the support frame 12.

The axis of rotation at the connection between the leg input link 90 of the leg linkage mechanism 88 and the support frame 12 is disposed proximate the seat 84, with the seat 84 disposed between the axis of rotation and the end 44 of the side member 42. The leg coupler 92 of the leg linkage mechanism 88 is connected to the arm 72 approximately midway along the length of the arm 72. The leg linkage mechanism 88 is configured such that an angle between the input link 90 and the coupler 92 is greater when the support frame 12 is in the raised position than when the support frame 12 is in the lowered position.

The drive linkage mechanism 100 comprises a drive input link or drive input lever 102, the drive output link or drive output lever 106, and a drive coupler 104 extending between and coupling the drive input link 102 and the drive output link 106.

Figure 11:
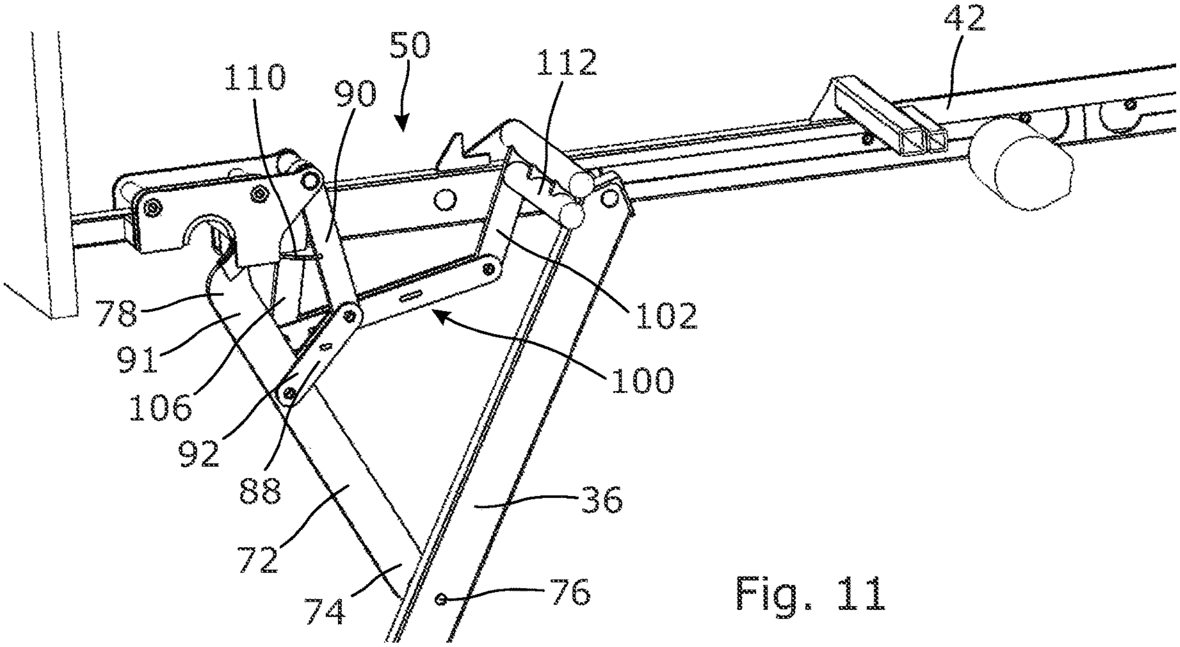
Figure 16:
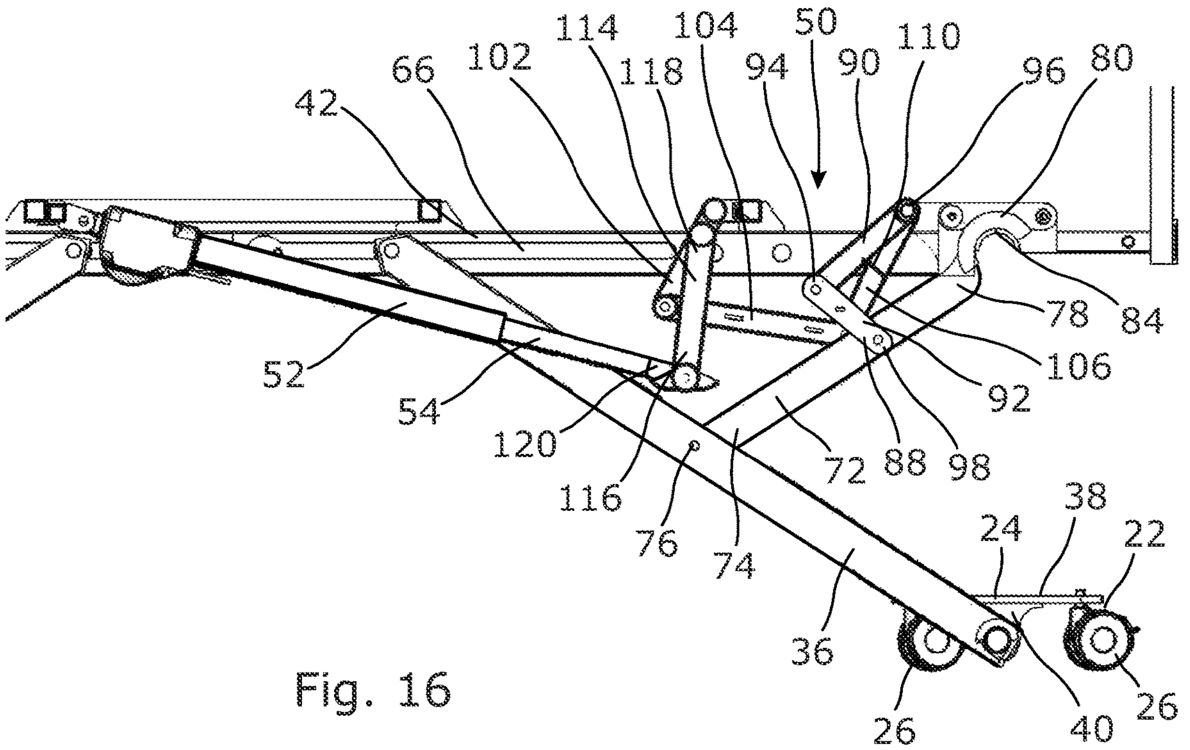
FIG. 16 is a plan view of one leg and associated linkage mechanisms according to the present invention.

As shown most clearly in FIGS. 7, 11 and 16, in this embodiment the drive input link 102 is rotatably connected to the support frame 12 about a first axis, the drive output link 106 is rotatably connected to the support frame 12 about a second axis and the drive coupler 104 connects the drive input link 102 to the drive output link 106.

The drive input link 102 is in the form of an elongate member having first and second ends. The first end of the drive input link 102 is connected to the support frame 12 at a point between the seat 84 and the first end 68 of the channel 66. In particular, the drive input link 102 is connected to the support frame 12 near the first end 68 of the channel 66. The rotational axis of the pivotal connection between the drive input link 102 and the support frame 12 extends perpendicular to the side member 42 of the support frame 12.

The drive output link 106 is in the form of an elongate member having first and second ends. The first end of the drive output link 106 is connected to the support frame 12 such that the rotational axis of the pivotal connection between the drive output link 106 and the support frame 12 is co-axial with the axis of rotation at the connection between the leg input link 90 and the support frame 12.

The drive coupler 104 is in the form of an elongate member having first and second ends. The drive coupler 104 extends between and connects to the second ends of each of the input and output links 102, 106.

The drive output link 106 is connected to the leg input link 90 by a connector 110. The connector 110 provides a rigid connection such that the drive output link 106 and leg input link 90 do not move relative to each other. Movement of the drive output link 106 is directly transmitted to movement of the leg input link 90. Furthermore, a force applied to the drive output link 106 is directly transmitted to the leg input link 90. In this embodiment the drive output link 106 and the leg input link 90 do not extend parallel to each other. An angle between the longitudinal axes of the drive output link 106 and leg input link 90 is less than 45°. In preferred embodiments a length of the drive output length 106 (between pivotal connections) is greater than a length of the leg input link 90 (between pivotal connections). A such, for a given force applied to the second end of the drive output link 106 by the drive coupler 104, a greater force is applied to the leg coupler 92 by the second end of the leg input link 90.

A connecting rod 112 extends from the drive input link 102. The connecting rod 112 is elongate and extends in a direction parallel to the rotational axis of the pivotal connection between the drive input link 102 and the support frame 12 (i.e. perpendicular to the side member 42 of the support frame 12). The connecting rod 112 is connected to the drive input link 102 proximate the first end of the drive input link 102.

A drive lever or drive member 114 connects the actuator 52 to the connecting rod 112. The drive lever 114 is elongate and extends between first and second ends 116, 118. The first end 116 of the drive lever 114 is rotatably connected to a second end 120 of the linear actuator 52. In this embodiment the drive lever 114 is connected to the end of the piston rod 54. The connection between the drive lever 114 and the actuator 52 is such that an angle between the drive lever 114 and the piston rod 54 is able to change as the linear actuator 52 is extended and retracted. A first end of the actuator 52 is rotatably connected to the support frame 12.

The second end 118 of the drive lever 114 is attached to the connecting rod 112. The connection between the drive lever 114 and the connecting rod 112 is rigid such that an angle between the drive lever 114 and the connecting rod 112 does not change during operation of the lifting mechanism. The drive lever 114 extends perpendicularly from the connecting rod 112, and the rotational axis of the connection between the drive lever 114 and the actuator 52 is parallel to the axis of the connecting rod 112.

Preferably a length of the drive lever 114 is greater than a length of the drive input link 102. This arrangement provides a mechanical advantage. In preferred embodiments the force applied to the drive coupler 104 by the drive input link 102 is greater than the force applied to the drive lever 114 due to the mechanical advantage of the configuration of the drive lever 114 and drive linkage mechanism 100.

As explained above, in this embodiment a first actuator 52*a* is arranged to apply a force to the mechanical linkages associated with both of the legs 36 connected to the pair of feet 22 of the first foot assembly 30*a*, and a second actuator 52*b* is arranged to apply a force to the mechanical linkages associated with both of the legs 36 connected to the pair of feet 22 of the second foot assembly 30*b*. A first connecting rod 112*a* therefore extends between and connects the drive input links 102 of the drive linkage mechanisms 100 associated with both of the legs 36 connected to the pair of feet 22 of the first foot assembly 30*a*, and a second connecting rod 112*b* therefore extends between and connects the drive input links 102 of the drive linkage mechanisms 100 associated with both of the legs 36 connected to the pair of feet 22 of the second foot assembly 30*b*. This is shown most clearly in FIG. 3*c*.

The operation of the lifting mechanism will now be described with particular reference to FIGS. 4 to 9.

To move the support frame 12 from the raised position to the lowered position the linear actuator 52 is activated to retract the piston rod 54. This causes the drive input link 102 to rotate about its connection to the support frame 12 due to the forces applied by the drive lever 114 and the connecting rod 112. During this rotational movement the second end of the drive input link 102 moves in a direction generally away from the end 14 of the support frame 12. The drive coupler 104 causes a corresponding rotation of the drive output link 106 about its first end.

The rotation of the drive output link 106 is matched by the rotation of the leg input link 90 of the leg linkage mechanism 88 due to the connector 110. This applies a force to the arm 72 through the leg coupler 92 of the leg linkage mechanism 88. This force causes rotation of the arm 72 about its second end 78 through relative sliding of the bearing surfaces 82, 86 of the arm 72 and seat 84 as described above. In this preferred embodiment the force applied to the arm 72 by the leg linkage mechanism 88 is greater than the force applied to the drive linkage mechanism 100 due to the mechanical advantage of the configuration of the drive linkage mechanism 100 and leg linkage mechanism 88.

Because in this embodiment the foot 22 remains in a fixed or static position, the arm 72 applies a force to the leg 36 to cause the leg 36 to rotate about its first end 56. Additionally, because the position of the second end 78 of the arm 72 is fixed in relation to the support frame 12, rotation of the leg 36 causes the second end 62 of the leg 36 to move along the channel 66 in a direction away from the end of the support frame 12 and towards the second end 70 of the channel 66. This relative movement of the arm 72 and leg 36 results in the second end of the arm 72, and therefore the support frame 12, moving in a direction towards the foot 22. Movement continues until the seat 84 is in contact with the shaft 28 of the foot assembly, as described above, and the support frame 12 is in its lowered position.

Figure 9:
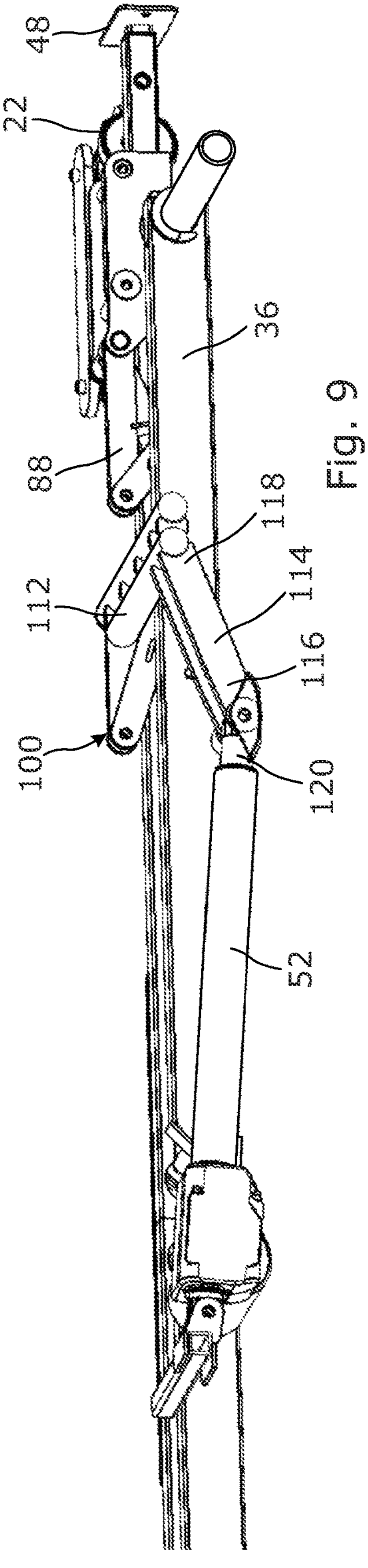
FIG. 9 shows a part of the lifting mechanism of FIG. 8.
Figure 10:
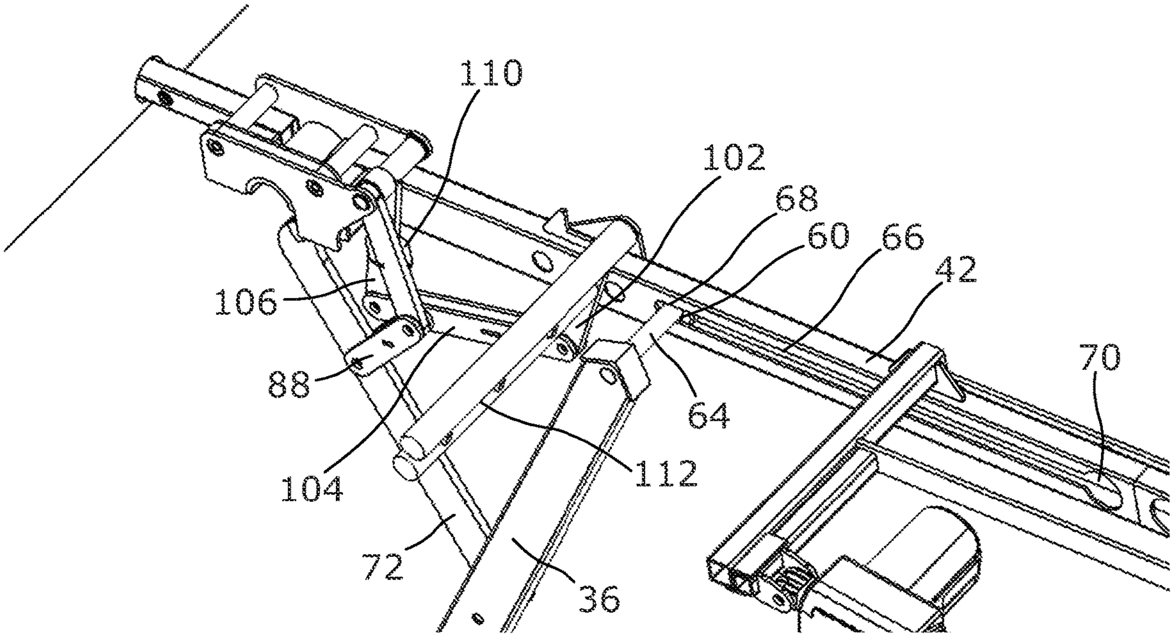
FIGS. 10 and 11 show an upper part of the lifting mechanism of the present invention, with the mechanism in a raised configuration.

When the support frame 12 is in the lowered position, as shown in FIG. 9, the axis of rotation of the second end 78 of the arm 72 lies in substantially the same plane as the rotational axes of the axles of the casters 26. Accordingly, the leg 36 extends parallel to the support plane. In this position there is preferably still a gap between a lower surface of the support frame 12 and the ground or floor on which the bed 10 is standing. This enables the bed 10 to be moved on the casters 26 even in the lowered position. The gap between the support frame 12 and the ground or floor is, however, preferably as small as practicable.

To move the support frame 12 from the lowered position to the raised position the linear actuator 52 is activated to extend the piston rod 54. This causes the drive input link 102 to rotate about its connection to the support frame 12 due to the forces applied by the drive lever 114 and the connecting rod 112. During this rotational movement the second end of the drive input link 102 moves in a direction generally towards the end 14 of the support frame 12. The drive coupler 104 of the drive linkage mechanism 100 causes a corresponding rotation of the drive output link 106 about its first end.

The rotation of the drive output link 106 is matched by the rotation of the leg input link 90 due to the connector 110. This applies a force to the arm 72 through the leg coupler 92 of the leg linkage mechanism 88. This force causes rotation of the arm 72 about its second end 78 through relative sliding of the bearing surfaces 82, 86 of the arm 72 and seat 84 as described above.

Because the foot 22 remains in a fixed or static position, the arm 72 applies a force to the leg 36 to cause the leg 36 to rotate about its first end 56. Additionally, because the position of the second end 78 of the arm 72 is fixed in relation to the support frame 12, rotation of the leg 36 causes the second end 62 of the leg 36 to move along the channel 66 in a direction towards the end 14 of the support frame 12 and towards the first end 68 of the channel 66. This relative movement of the arm 72 and leg 36 results in the second end 78 of the arm 72, and therefore the support frame 12, moving in a direction away from the foot 22. Movement continues until the carriage member 60 reaches the first end 68 of the channel 66 and the support frame 12 is in its raised position.

Although in the above embodiment the actuators are linear actuators, it will be appreciated that in other embodiments the actuators may be of any suitable type and configuration. Importantly, the actuators must be accommodated below the support frame when the frame is in the lowered position.

Furthermore, the lifting mechanism may comprise more than two actuators, or may include only one actuator. In some embodiments a separate actuator may be connected to each of the four feet. This may permit smaller or less powerful actuators to be used. The actuators may still be linked so that the two actuators connected to feet near the headboard end of the bed are always operated simultaneously and the two actuators connected to feet near the footboard end of the bed are always operated simultaneously. In other embodiments the lifting mechanism may comprise a single actuator and additional linkages permitting the actuator to drive movement of all four legs of the bed.

The wheels or casters of the feet of the bed may include a brake mechanism that may be operated to prevent rotation of the wheels. In other embodiments the feet may not include wheels. In embodiments in which the feet include wheels or casters, each foot may include only one wheel or may include more than two wheels.

It will be appreciated that in other embodiments the configuration and arrangement of the leg linkage mechanism and drive linkage mechanism may be different to that described above. For example, each of the leg linkage mechanism and the drive linkage mechanism may include a different number of links or members to that described above. The leg linkage mechanism and drive linkage mechanism are configured to transmit movement of the actuator to the arm and leg of the lifting mechanism. Furthermore it is desirable if the leg linkage mechanism and drive linkage mechanism are contained under or adjacent the support frame when the support frame is in the lowered position. In preferred embodiments each of the drive linkage mechanism and the leg linkage mechanism are in the form of four-bar linkages.

Figure 18:
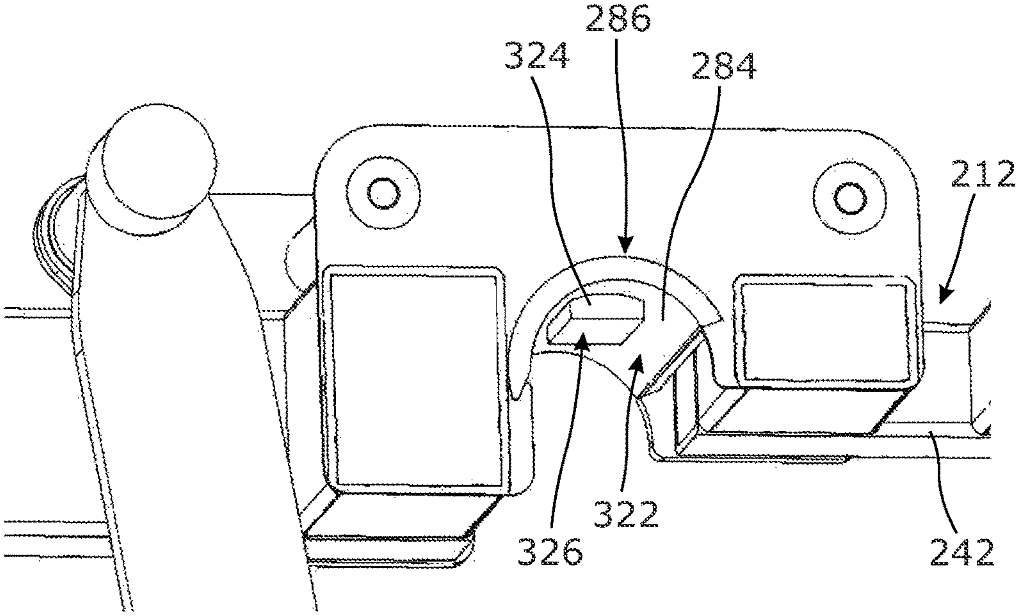
FIG. 18 is a view of a seat attached to a side member of a bed frame according to a preferred embodiment of the invention.
Figure 19:
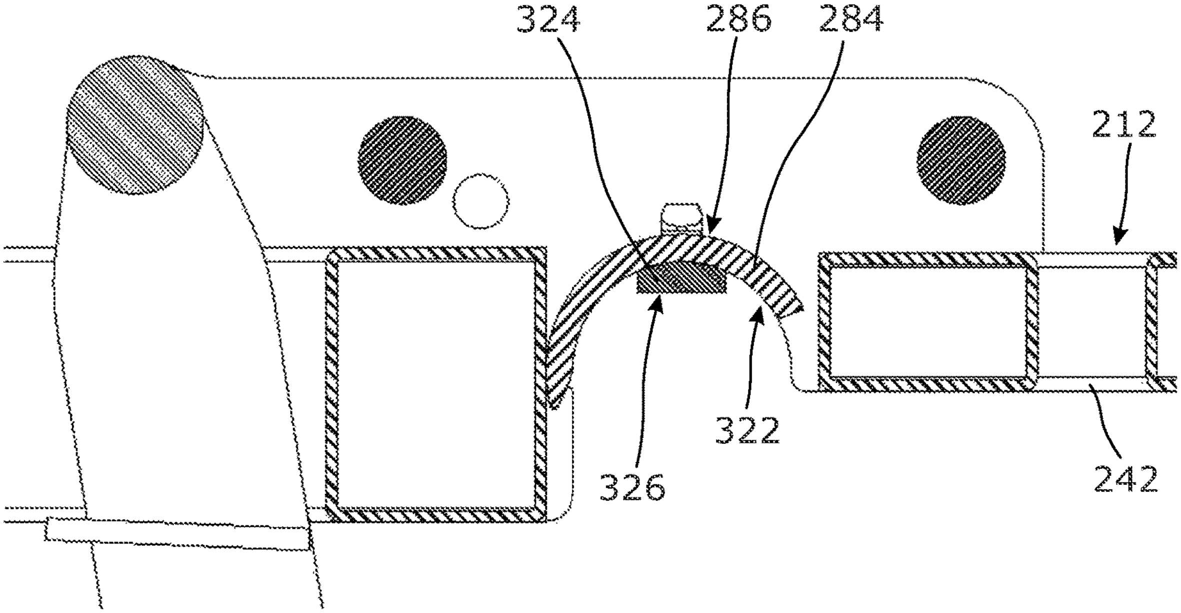
FIG. 19 is a cross-sectional view of the seat of FIG. 18.

In a further embodiment, illustrated in FIGS. 18 and 19, a side member 242 of a support frame 212 includes a seat 284 with which a saddle portion of an arm engages as described above.

The seat 284 is in the form of a part cylindrical member having a concave curved surface 322 and an opposite convex curved surface. The convex surface provides a bearing surface 286 of the seat 284. The seat 284 is attached to the side member 242 in a fixed position with the concave surface facing downwards towards a foot of the bed. The position of the seat 284 with respect to an end of the side member 242 is such that when the support frame 212 is in the lowered position, a shaft of a foot assembly of the bed is received in the part cylindrical member of the seat 284.

In this embodiment the seat further comprises a bearing pad 324 connected to the part cylindrical member. The bearing pad 324 is in contact with and extends from the concave curved surface 322 of the part cylindrical member.

The curvature and the dimensions of the seat 284 are such that, when the support frame 212 is in the lowered position, the shaft of the foot assembly is received in the part cylindrical member of the seat 84, and a part of the shaft of the foot assembly is in contact with a bearing surface 326 of the bearing pad 324. The bearing pad 324 is preferably made from a suitable polymeric material.

In yet further embodiments the first end of the arm is rotatably connected to the side member of the support frame. The support frame does not comprise a seat and the arm does not include a saddle portion. The bed may reach its lowered position when the shaft of a foot assembly contacts the side member of the support frame. In the lowered position the rotational axis of the connection between the arm and the side member may not be co-axial with the shaft of the foot assembly.

The present invention therefore provides an improved bed lifting mechanism that allows a bed to be lowered close to the floor to reduce injuries from falls and to be raised to a suitable height whilst permitting removal of the headboard and/or footboard of the bed (when present) to enable easy access to a person lying on the bed. Furthermore, a mechanical advantage of linkage mechanisms connecting an actuator to a leg of the bed allows a greater load to be lifted by the lifting mechanism, for a given size of actuator, than with prior art systems.

The invention claimed is:

1. A lifting mechanism for a bed, comprising:

a leg connecting a foot assembly to a frame for supporting a mattress, the frame defining a support plane; and a linkage mechanism connected between the frame and the leg and configured to allow the frame to move with respect to the foot assembly in a direction perpendicular to the support plane between a raised position and a lowered position, the linkage mechanism comprising an arm, a first end of the arm being pivotally connected to the frame and a second end of the arm being pivotally connected to the leg, wherein during movement of the frame between the raised and lowered positions the foot assembly does not move in a direction parallel to the support plane, and in which the frame comprises a seat having a convex bearing surface and the first end of the arm comprises a concave bearing surface, and sliding of the convex bearing surface over the concave bearing surface causes the arm to pivot with respect to the frame.

2. The lifting mechanism of claim 1, wherein in the lowered position the leg extends parallel to the support plane.

3. The lifting mechanism of claim 1 further comprising an actuator arranged to apply a force to the linkage mechanism to move the frame.

4. The lifting mechanism of claim 3, in which the actuator is a linear actuator.

5. The lifting mechanism of claim 1, in which the leg is pivotally attached to the frame.

6. The lifting mechanism of claim 1, in which a slot is provided in a side member of the frame and an end of the leg is engaged with the slot, the end of the leg moving between first and second ends of the slot as the frame moves between the raised and lowered positions.

7. The lifting mechanism of claim 1, in which the leg is pivotally connected to the foot assembly.

8. The lifting mechanism of claim 7, in which the foot assembly comprises a pair of feet joined by a connecting shaft, and the leg is pivotally connected to the shaft.

9. The lifting mechanism of claim 1, wherein a first end of the leg is pivotally connected to the frame and a second end of the leg is pivotally connected to the foot assembly, and in which (i) a first distance is defined between a pivot axis of the connection between the first end of the arm and the frame and a pivot axis of the connection between the second end of the arm and the leg, (ii) a second distance is defined between a pivot axis of the connection between the first end of the leg and the frame and the pivot axis of the connection between the second end of the arm and the leg, and (iii) a third distance is defined between a pivot axis of the connection between the second end of the leg and the foot assembly and the pivot axis of the connection between the second end of the arm and the leg, and wherein the first, second and third distances are the same.

10. The lifting mechanism of claim 1 further comprising an actuator arranged to apply a force to the linkage mechanism to move the frame, and in which the actuator is indirectly connected to the arm via a series of pivotally connected links.

11. The lifting mechanism of claim 1 further comprising a linear actuator arranged to apply a force to the linkage mechanism to move the frame, and in which as a length of the linear actuator increases, an angle between the arm and the frame increases.

12. The lifting mechanism of claim 1, in which the seat is seated on a part of the foot assembly when the frame is in the lowered position.

13. The lifting mechanism of claim 12, wherein the foot assembly comprises a pair of feet joined by a connecting shaft, and in which the seat includes a concave surface and a bearing pad projecting from the concave surface, at least a part of the bearing pad being in contact with the shaft when the frame is in the lowered position.

14. A bed comprising:

a support for a mattress including a frame, the frame defining a support plane;

a foot assembly; and a lifting mechanism comprising a leg connecting the foot assembly to the frame; and a linkage mechanism connected between the frame and the leg and configured to allow the frame to move with respect to the foot assembly in a direction perpendicular to the support plane between a raised position and a lowered position, the linkage mechanism comprising an arm, a first end of the arm being pivotally connected to the frame and a second end of the arm being pivotally connected to the leg, wherein in the lowered position the leg extends parallel to the support plane, and during movement of the frame between the raised and lowered positions the foot assembly does not move in a direction parallel to the support plane, and in which the frame comprises a seat having a convex bearing surface and the first end of the arm comprises a concave bearing surface, and sliding of the convex bearing surface over the concave bearing surface causes the arm to pivot with respect to the frame.

15. The bed of claim 14, in which the foot assembly comprises a pair of feet joined by a connecting shaft, the leg is pivotally connected to the shaft, and each of the feet comprises at least one wheel, each wheel being rotatable about an axle and wherein an axis of the shaft lies in the same plane as the axles.

16. The bed of claim 14 including two foot assemblies, a first foot assembly comprising a first pair of feet proximate a first end of the bed and a second foot assembly comprising a second pair of feet proximate a second end of the bed, wherein the lifting mechanism comprises a first leg and a second legs connecting the first foot assembly to the frame and a third leg and a fourth legs connecting the second foot assembly to the frame, and a set of four linkage mechanisms, each linkage mechanism of the set of four linkage mechanisms is connected between one of the first leg, the second leg, the third leg and the fourth leg and the frame, and wherein the lifting mechanism further comprises a first actuator arranged to apply a first force to a first two linkage mechanisms of the set of four linkage mechanisms associated with the first leg and the second leg and a second actuator arranged to apply a second force to a second two linkage mechanisms associated with the third leg and the fourth leg.

17. The bed according to claim 14, in which the frame comprises a side member extending between first and second ends of the bed, the side member includes a channel extending in a length direction along the side member and the leg includes a carriage member engaged with the channel and wherein, as the frame moves between the raised and lowered positions, the carriage member slides along the channel between first and second ends of the channel.

18. The bed of claim 17, in which the first end of the channel is nearer an end of the side member than the second end of the channel, and the arm is connected to the side member between the first end of the channel and the end of the side member.

* * * * *